United States Patent
Nakagawa et al.

(10) Patent No.: US 8,084,163 B2
(45) Date of Patent: Dec. 27, 2011

(54) FUEL CELL

(75) Inventors: Takashi Nakagawa, Osaka (JP);
Toshihiro Matsumoto, Osaka (JP);
Shinsuke Takeguchi, Osaka (JP);
Miyuki Yoshimoto, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/128,701

(22) PCT Filed: Sep. 30, 2009

(86) PCT No.: PCT/JP2009/005024
§ 371 (c)(1),
(2), (4) Date: May 11, 2011

(87) PCT Pub. No.: WO2010/055607
PCT Pub. Date: May 20, 2010

(65) Prior Publication Data
US 2011/0212381 A1    Sep. 1, 2011

(30) Foreign Application Priority Data

Nov. 12, 2008 (JP) ................. 2008-290010

(51) Int. Cl.
*H01M 2/38* (2006.01)
(52) U.S. Cl. ........ 429/456; 429/457; 429/483; 429/492; 429/480
(58) Field of Classification Search .......... 429/455, 429/456, 457, 458, 465, 480, 483, 492, 518, 429/513
See application file for complete search history.

(56) References Cited

U.S. PATENT DOCUMENTS

| 5,549,983 | A | * | 8/1996 | Yamanis | 429/461 |
| 5,776,625 | A | * | 7/1998 | Kaufman et al. | 429/434 |
| 2003/0157387 | A1 | | 8/2003 | Hase et al. | |
| 2004/0157103 | A1 | | 8/2004 | Takeguchi et al. | |
| 2005/0238800 | A1 | * | 10/2005 | Shinn et al. | 427/115 |

FOREIGN PATENT DOCUMENTS

| JP | 01-095468 A | 4/1989 |
| JP | 2000-012051 A | 1/2000 |
| JP | 2002-050392 A | 2/2002 |
| JP | 2002-208417 A | 7/2002 |
| JP | 2002-270201 A | 9/2002 |
| JP | 2003-249243 A | 9/2003 |
| JP | 2004-247289 A | 9/2004 |
| JP | 2008-066242 A | 3/2008 |
| JP | 2008-112738 A | 5/2008 |
| JP | 4226332 B2 | 12/2008 |

OTHER PUBLICATIONS

International Search Report for PCT/JP2009/005024 dated Jan. 12, 2010.

* cited by examiner

*Primary Examiner* — Raymond Alejandro
(74) *Attorney, Agent, or Firm* — Pearne & Gordon LLP

(57) ABSTRACT

A fuel cell comprising: a membrane electrolyte assembly having a polymer electrolyte membrane and a pair of catalyst electrodes, namely an air electrode and a fuel electrode sandwiching the polymer electrolyte membrane; a pair of separators, namely an air electrode separator and a fuel electrode separator sandwiching the membrane electrolyte assembly; two or more oxidizing gas channels running in a certain direction for the purpose of supplying an oxidizing gas to the air electrode; and two or more linear fuel gas channels arranged parallel to the certain direction for the purpose of supplying a fuel gas to the fuel electrode. Large gaps and small gaps are provided alternately between adjacent two oxidizing gas channels along the certain direction, and the fuel gas channels do not overlap portions of the oxidizing gas channels, that are parallel to the fuel gas channels.

10 Claims, 19 Drawing Sheets

FUEL CELL

TECHNICAL FIELD

The present invention relates to a fuel cell.

BACKGROUND ART

A fuel cell is composed of a polymer electrolyte membrane which selectively transports protons, and a pair of catalyst electrodes (a fuel electrode and an air electrode) which sandwich the polymer electrolyte membrane. The fuel cell which has the above structure can continuously take out electric energy by supplying a fuel gas (hydrogen is contained) to the fuel electrode, and supplying an oxidizing gas (oxygen is contained) to the air electrode.

The polymer electrolyte membrane is composed of an electrolyte which contains a polymer ion-exchange membrane or the like, such as a sulfonic acid group-containing fluorine resin ion-exchange membrane or hydrocarbon resin ion-exchange membrane. In order for the polymer electrolyte membrane to have an ion transport function, it needs to contain a given quantity of water.

The catalyst electrode is composed of a catalyst layer that promotes a redox reaction therein and of a gas diffusion layer having air permeability and electric conductivity. The catalyst layer is positioned on the polymer electrolyte membrane side. The gas diffusion layer is composed of a carbon coat layer for improving adhesion to the catalyst layer and of a gas diffusion base layer through which a gas supplied from an external source is allowed to diffuse to the catalyst layer. The catalyst layer for the fuel electrode contains, for example, platinum or platinum-ruthenium alloy, and the catalyst layer for the air electrode contains, for example, platinum or platinum-cobalt alloy. An assembly of such a polymer electrolyte membrane and a pair of catalyst electrodes (each composed of a catalyst layer, a carbon coat layer, and a gas diffusion base layer) is called a membrane electrode assembly (hereinafter "MEA").

MEAs can be electrically connected in series by stacking them on top of each other. At this time, in order to keep a fuel gas and an oxidizing gas from being mixed and to electrically connect each MEA in series, a conductive separator is disposed between each of the MEAs.

Separators include a fuel electrode separator which contacts a fuel electrode, and an air electrode separator which contacts an air electrode. Usually, fuel gas channels for supplying a fuel gas to the MEA are formed in the fuel electrode separator, and oxidizing gas channels for supplying an oxidizing gas to the MEA are formed in the air electrode separator.

In a conventional fuel cell, linear gas channels run in parallel to one another (see, e.g., Patent Literature 1). FIG. 1 is an exploded perspective view of the fuel cell disclosed by Patent Literature 1. The fuel cell illustrated in FIG. 1 has membrane electrode assembly 1, air electrode separator 2, and fuel electrode separator 3. Air electrode separator 2 has linear oxidizing gas channels 8 that run in parallel to one another.

In a fuel cell configured as described above, the gap between oxidizing gas channels, i.e., rib width, is generally small. Since ribs do not contribute to supply of an oxidizing gas unlike oxidizing gas channels, reducing rib width makes it possible to supply more oxidizing gas to the MEA. Therefore, in the conventional fuel cell, in order to increase the amount of oxidizing gas to be supplied, rib width is tended to be made small.

Moreover, as described above, the polymer electrolyte membrane needs to contain a given quantity of water for exerting permeability to ions. Therefore, in the conventional fuel cell, in order to ensure sufficient water content, fuel gas and oxidizing gas are humidified in advance. However, a humidifier for humidifying the oxidizing gas does not contribute to power generation directly; rather, it requires a space for installation. Therefore, development of a fuel cell cogeneration system that does not need any humidifier can achieve reductions in size as well as overall system cost reduction. Development of such a fuel cell cogeneration system can also avoid energy loss from the humidifier, thus increasing overall system efficiency. For these reasons, development of a fuel cell has been desired in which power generation efficiency does not decrease even when a less humidified or non-humidified oxidizing gas is employed.

As a conventional technology aiming to prevent the flooding phenomenon, which occurs when the water generated in the reaction gas channel during power generation remains, two or more discrete reaction gas channels are provided in the separator (see, e.g., Patent Literatures 2, 3 and 4). In the fuel cells disclosed by Patent Literatures 2, 3 and 4, each discrete reaction gas channel is formed as a serpentine channel.

As a conventional technology aiming to ensure the hardness of ribs that define reaction gas channels, two or more reaction gas channels are provided in parallel to one another (see, e.g., Patent Literature 5). The reaction gas channels of the fuel cell disclosed by Patent Literature 5 are made serpentine. The separator for the fuel cell disclosed by Patent Literature 5 is a carbon separator.

CITATION LIST

Patent Literature

Patent Literature 1: Japanese Patent Application Laid-Open No. 2003-249243
Patent Literature 2: Japanese Patent Application Laid-Open No. 2004-247289
Patent Literature 3: U.S. Patent Application Publication No. 2004/0157103
Patent Literature 4: Japanese Patent Application Laid-Open No. 2002-50392
Patent Literature 5: Japanese Patent Application Laid-Open No. 2008-66242

SUMMARY OF INVENTION

Technical Problem

In order to operate a fuel cell under low- or non-humidity condition, it becomes a challenge to retain the water, generated in the catalyst layer of the air electrode during power generation, within the fuel cell. With reference to the drawings, the following describes how water generated in the catalyst layer of the air electrode during power generation moves inside the fuel cell.

FIG. 2 is a partial sectional view of a fuel cell, cut perpendicularly to the plane of an MEA. The fuel cell illustrated in FIG. 2 includes MEA 110, air electrode separator 120, and fuel electrode separator 130. The MEA further includes polymer electrolyte membrane 111, air electrode catalyst layer 113, fuel electrode catalyst layer 115, air electrode gas diffusion layer 117, and fuel electrode gas diffusion layer 119. Air electrode separator 120 includes oxidizing gas channel 121 and rib 123. Fuel electrode separator 130 includes fuel gas channel 131 and rib 133. Arrows Z indicate movements of water generated in air electrode catalyst layer 113. Ribs 123 and 133 form a gap between gas channels.

As illustrated in FIG. 2, the water generated in air electrode catalyst layer 113 diffuse to oxidizing gas channel 121, with some of the water moving under rib 123. The water moved into oxidizing gas channel 121 passes across the channel and is discharged to the outside of the fuel cell, and the water moved under rib 123 is retained therein. Thus, by reducing the quantity of water to be discharged through oxidizing gas channels while increasing the quantity of water to be retained under ribs, more quantity of water, generated in the catalyst layer of the air electrode during power generation, can be retained in the fuel cell.

In a fuel cell such as that disclosed by Patent Literature 1, the gap (rib width) between adjacent oxidizing gas channels is small. For this reason, a large portion of water generated during power generation will move through oxidizing gas channels to the outside of the fuel cell. Moreover, the smaller the rib width, the more it becomes easy for water retained under ribs to be diffused into oxidizing gas channels. This causes drying up of the MEA and thus reduces output density. Drying up of MEA not only results in low output density, but also facilitates deterioration of MEA, thus shortening fuel cell life.

In a fuel cell such as that disclosed by Patent Literature 1, MEA's humidity may be kept by increasing the quantity of water retained under ribs by enlarging the gap (rib width) between oxidizing gas channels. However, simply enlarging rib width leads to reduction in the quantity of oxidizing gas supplied to the MEA, resulting in low power density.

It is therefore an object of the present invention to provide a fuel cell that can secure sufficient quantity of water in the fuel cell and can supply sufficient quantity of oxygen gas to the MEA, even when a less humidified or non-humidified oxygen gas is employed.

Solution to Problem

The present invention relates to fuel cells given below.
[1] A fuel cell including:
a membrane electrolyte assembly, the membrane electrolyte assembly including a polymer electrolyte membrane and a pair of catalyst electrodes consisting of an air electrode and a fuel electrode, the catalyst electrodes sandwiching the polymer electrolyte membrane;
a pair of separators consisting of an air electrode separator and a fuel electrode separator, the separators sandwiching the membrane electrolyte assembly;
two or more oxidizing gas channels for supplying an oxidizing gas to the air electrode, the oxidizing gas channels running in a specific direction; and
two or more linear fuel gas channels for supplying a fuel gas to the fuel electrode, the fuel gas channels running in parallel to the specific direction,
wherein large gaps and small gaps are provided alternately between the two adjacent oxidizing gas channels along the specific direction, and the fuel gas channels do not overlap portions of the oxidizing gas channels, that are parallel to the fuel gas channels.
[2] The fuel cell according to [1], wherein the oxidizing gas channels are defined by a rib permeable to the oxidizing gas, and the rib is made of a conductive porous body.
[3] The fuel cell according to [2], wherein the conductive porous body has an average pore diameter of 10 μm or less.
[4] The fuel cell according to any one of [1] to [3], wherein the two or more oxidizing gas channels are made serpentine, and
the two adjacent oxidizing gas channels are symmetrical with respect to a line running parallel to the specific direction.
[5] The fuel cell according to any one of [1] to [4], wherein the oxidizing gas channels are formed in the air electrode separator.
[6] The fuel cell according to [5], wherein the air electrode separator includes a metal plate and a rib made of a conductive porous body, the rib formed on the metal plate.
[7] The fuel cell according to any one of [1] to [4], wherein the air electrode includes a catalyst layer contacting the polymer electrolyte membrane, and a gas diffusion layer laminated on the catalyst layer and contacting the air electrode separator, and
the oxidizing gas channels are formed in the gas diffusion layer.
[8] The fuel cell according to any one of [1] to [7], wherein the fuel gas channels are formed in the fuel electrode separator, the fuel electrode separator includes a rib defining the fuel gas channels, and
the rib is impermeable to the fuel gas.
[9] The fuel cell according to [8], wherein the fuel electrode separator is a carbon separator or a metal separator.
[10] The fuel cell according to any one of [1] to [9], wherein a flow direction of the oxidizing gas in the oxidizing gas channels and a flow direction of the fuel gas in the fuel gas channels are the same as the specific direction, and
the oxidizing gas to be supplied to the fuel cell has a dew point of 45° C. or less.
[11] The fuel cell according to any one of [1] to [9], wherein a flow direction of the oxidizing gas in the oxidizing gas channels and a flow direction of the fuel gas in the fuel gas channels are the same as the specific direction,
the oxidizing gas to be supplied to the fuel cell has a dew point of −10 to 45° C., and
the oxidizing gas to be supplied to the fuel cell is not humidified.
[12] The fuel cell according to any one of [1] to [9], wherein a flow direction of the oxidizing gas in the oxidizing gas channels is the same as the specific direction,
a flow direction of the fuel gas in the fuel gas channels is opposite to the specific direction, and
the oxidizing gas to be supplied to the fuel cell has a dew point of 55 to 75° C.
[13] A fuel cell including
a membrane electrolyte assembly, the membrane electrolyte assembly including a polymer electrolyte membrane and a pair of catalyst electrodes consisting of an air electrode and a fuel electrode, the catalyst electrodes sandwiching the polymer electrolyte membrane;
a pair of separators consisting of an air electrode separator and a fuel electrode separator, the separators sandwiching the membrane electrolyte assembly; and
two or more oxidizing gas channels for supplying an oxidizing gas to the air electrode, the oxidizing gas channels running in a specific direction,
wherein the oxidizing gas channels are composed of a upstream region and a downstream region,
in the upstream region there are provided large gaps and small gaps alternately between the two adjacent oxidizing gas channels along the specific direction,
in the downstream region, the gaps between the two adjacent oxidizing gas channels are the same, and
the gap between the two adjacent oxidizing gas channels in the downstream region is smaller than a maximum gap between the two adjacent oxidizing gas channels in the upstream region.

ADVANTAGEOUS EFFECTS OF INVENTION

According to the fuel cell of the present invention, even when a less humidified or non-humidified oxygen gas is employed, it is possible to ensure sufficient quantity of water in the fuel cell, and to supply sufficient quantity of oxygen gas to the MEA. According to the present invention, it is also possible to selectively supply a fuel gas to regions of a polymer electrolyte membrane where the membrane resistance is small and the concentration of oxidizing gas is high. Thus, even when the fuel cell of the present invention is supposed to be supplied with a less humidified or non-humidified oxygen gas, it can ensure MEA's durability and high power density.

DESCRIPTION OF EMBODIMENTS

Figure 1:
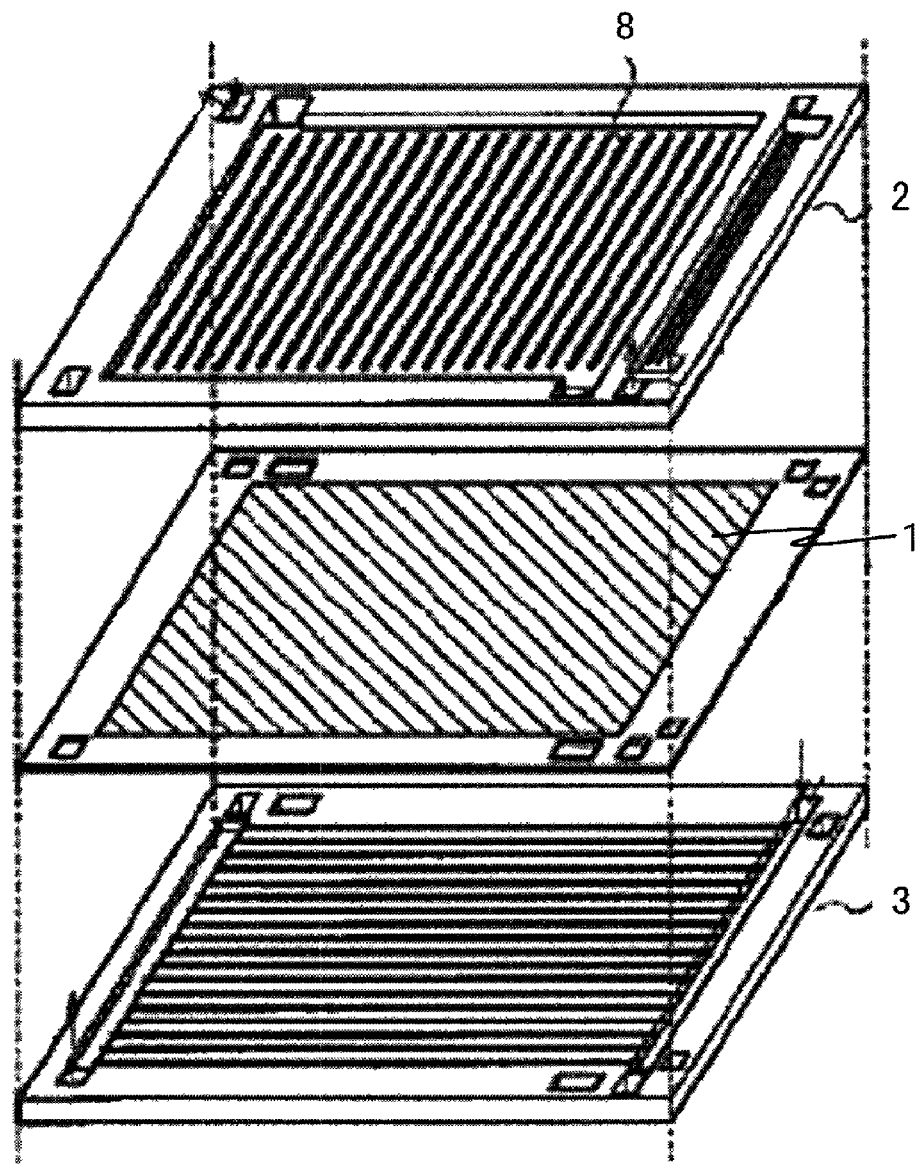
FIG. 1 is an exploded perspective view of a conventional fuel cell.
Figure 2:
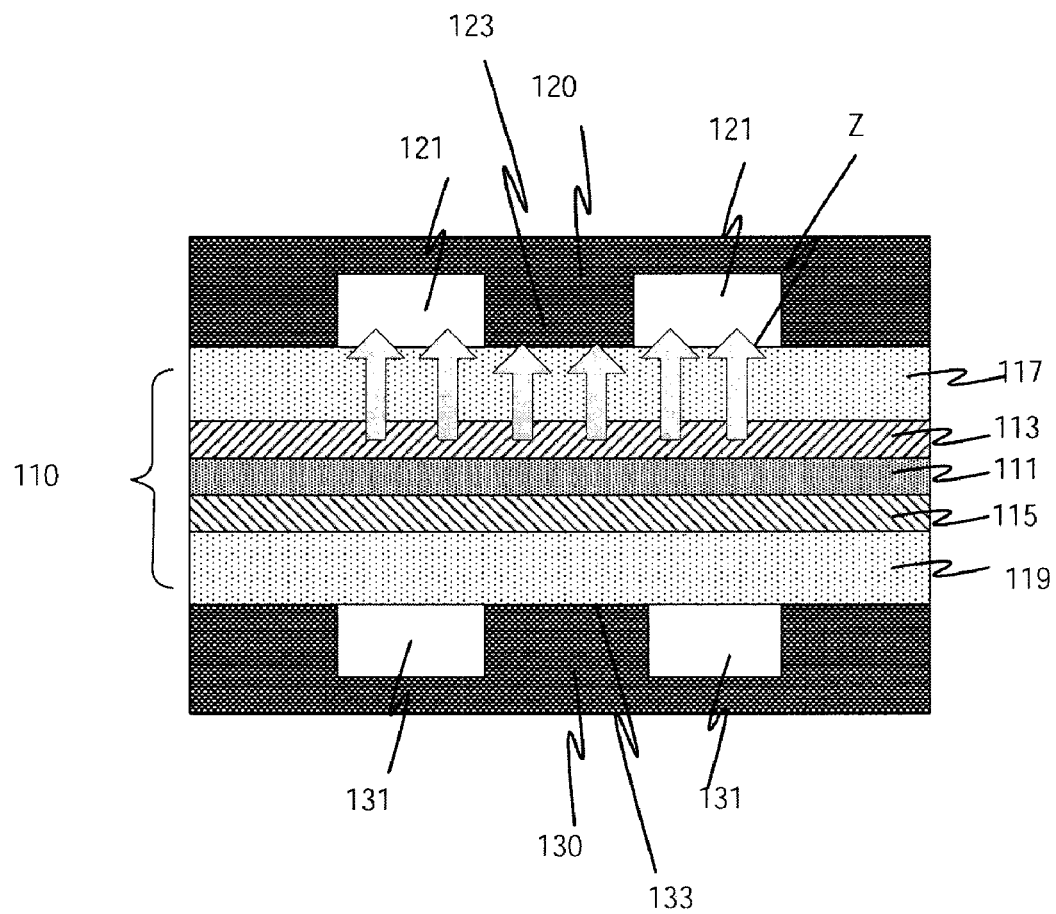
FIG. 2 illustrates how water in a conventional fuel cell moves.

A fuel cell of the present invention includes 1) an MEA, 2) a pair of separators (an air electrode separator and a fuel electrode separator), 4) a plurality of oxidizing gas channels, and 5) a plurality of fuel gas channels. The fuel cell of the present invention also concerns a fuel cell to which a less humidified or non-humidified oxidizing gas is supplied.

(1) Membrane Electrode Assembly (MEA)

An MEA includes a polymer electrolyte membrane and a pair of catalyst electrodes (an air electrode and a fuel electrode) which sandwich the polymer electrolyte membrane. The air electrode preferably includes an air electrode catalyst layer which contacts the polymer electrolyte membrane, and an air electrode gas diffusion layer laminated on the air electrode catalyst layer. Similarly, the fuel electrode preferably includes a fuel electrode catalyst layer which contacts the polymer electrolyte membrane, and a fuel electrode gas diffusion layer laminated on the fuel electrode catalyst layer.

The polymer electrolyte membrane is a polymer membrane which selectively transports protons in a humidified state. The material of the polymer electrolyte membrane is not specifically limited as long as protons can be selectively transported; examples thereof include fluorine polymer electrolyte membranes and hydrocarbon polymer electrolyte membranes. Specific examples of fluorine polymer electrolyte membranes include Nafion® membranes (DuPont), Flemion® membranes (Asahi Glass Co., Ltd.), Aciplex® membranes (Asahi Kasei Corporation), and GORE-SELECT® membranes (Japan Gore-Tex Inc.).

The air electrode catalyst layer contains a catalyst which promotes a redox reaction of hydrogen and oxygen. The air electrode catalyst layer is not specifically limited as long as it is electrically conductive and is catalytically active for promoting the redox reaction of hydrogen and oxygen. The air electrode catalyst layer contains, as a catalyst, platinum, platinum-cobalt alloy, platinum-cobalt-nickel alloy or the like.

The fuel electrode catalyst layer contains a catalyst which promotes oxidization reaction of hydrogen. The fuel electrode catalyst layer is not specifically limited as long as it is electrically conductive and is catalytically active for promoting the oxidization reaction of hydrogen. The fuel electrode catalyst layer contains, as a catalyst, platinum, platinum-ruthenium alloy or the like.

The air electrode catalyst layer and fuel electrode catalyst layer are each prepared for instance by applying on a polymer electrolyte membrane a mixture of (i) carbon fine particles (e.g., acetylene black, Ketjen Black or Vulcan) bearing the corresponding catalyst, (ii) a proton conductive electrolyte, and (iii) water-repellent resin such as polytetrafluoroethylene (PTFE).

The gas diffusion layers (air electrode gas diffusion layer and fuel electrode gas diffusion layer) are conductive porous layers placed at the outermost sides of MEA and contact respective separators (later described). The material of the gas diffusion layers is not specifically limited as long as the material is electrically conductive and is capable of diffusing a reaction gas. The gas diffusion layer may be composed of a gas diffusion base layer that diffuses a gas supplied from the separator side to the catalyst layer, and a carbon coat layer that improves contact between the gas diffusion layer and the catalyst layer.

The gas diffusion layer may be prepared by heat-pressing carbon fiber impregnated with water-repellent resin such as (PTFE), carbon cloth woven from carbon threads, or sheet of carbon paper, against the catalyst layer surface.

(2) Separator

A separator is a conductive plate for mechanically securing an MEA and for avoiding mixing of an oxidizing gas and a fuel gas which are to be supplied to the MEA. An air electrode separator contacts an air electrode, and a fuel electrode separator contacts a fuel electrode.

(3) Oxidizing Gas Channel

An oxidizing gas channel is a channel through which an oxidizing gas is supplied to the air electrode. Preferably, the oxidizing gas channel is around 0.8 to 1.2 mm in width and 0.3 to 0.8 mm in depth. The oxidizing gas channel is defined by ribs.

Preferably, the ribs which define oxidizing gas channels are electrically conductive and are permeable to an oxidizing gas. By making the ribs permeable to an oxidizing gas, the gas can be diffused not only in the oxidizing gas channels, but also throughout the ribs. For this reason, the oxidizing gas can be supplied to the air electrode from the oxidizing gas channels, as well as from the ribs which define the oxidizing gas channels. It is thus possible to supply the oxidizing gas to the entire surface of the air electrode, thereby enlarging the power generation area of the air electrode.

The material for such a rib is not specifically limited, but it is preferably made of conductive porous body. The conductive porous body is preferably 10 µm or less in average pore diameter, more preferably 5 µm or less in average pore diameter. The average pore diameter of a conductive porous body can be found by calculating an average of circle equivalent diameters based on the areas of pores in a cross-sectional SEM image of the porous body. Alternatively, average pore size of a conductive porous body can be found by measuring the pore size distribution by mercury porosimetry.

Specific examples of such a conductive porous body include carbon fiber impregnated with water-repellent resin such as (PTFE), carbon cloth woven from carbon threads, sheet of carbon paper, and carbon sheet obtained by kneading carbon fiber with PTFE and making the kneaded material into a sheet.

As a porous body has a large surface area, when ribs which define oxidizing gas channels are made porous, the contact area between the air electrode separator and air electrode increases, thus reducing the contact resistance between them. This makes it possible to take out the generated electric power efficiently.

Figure 14:
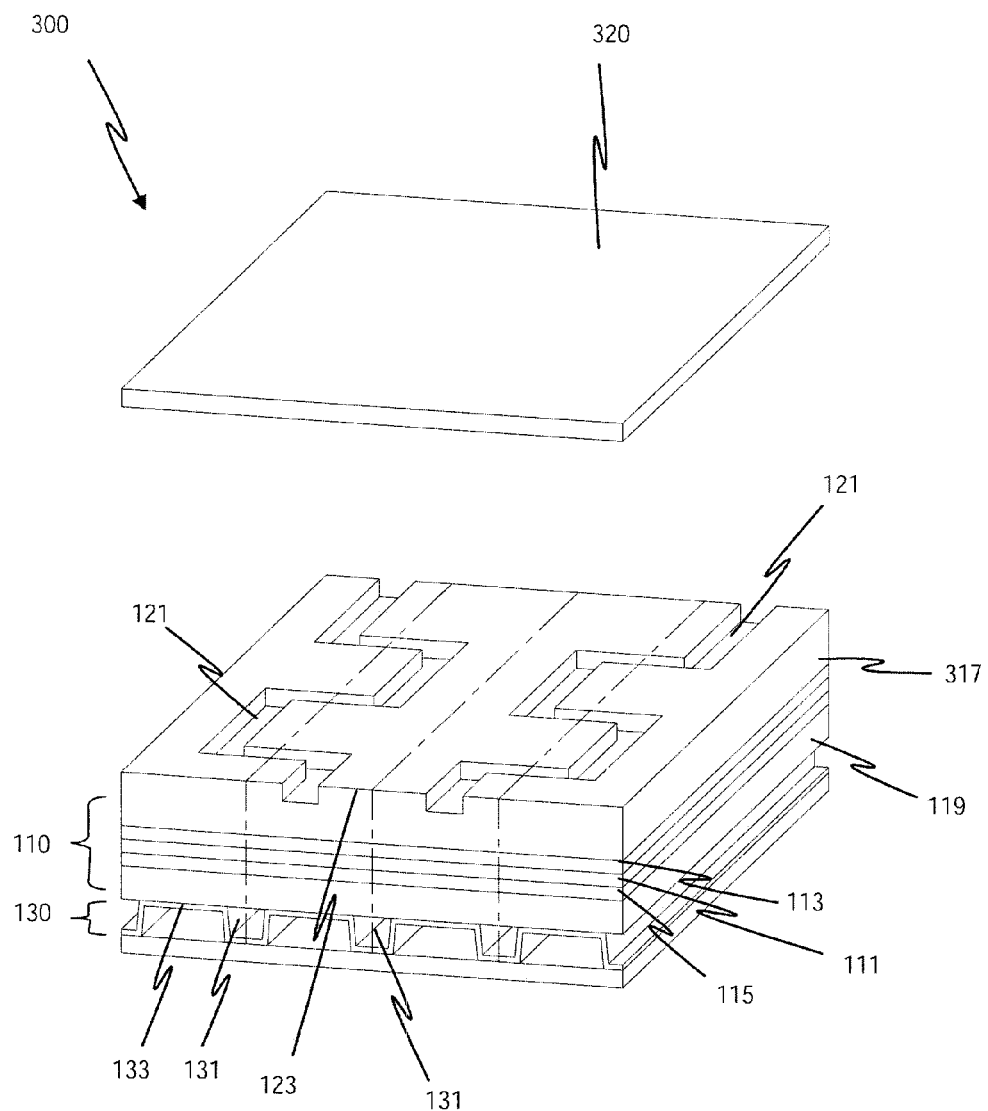
FIG. 14 is an exploded perspective view of a fuel cell of Embodiment 3.

In the present invention, oxidizing gas channels may be formed in the air electrode separator (see FIG. 10), or in the air electrode gas diffusion layer (see FIG. 14). When forming oxidizing gas channels in the air electrode separator, the air electrode separator may be composed of a conductive plate and of ribs made of conductive porous body which are disposed on the plate. The plate is a metal plate, for example.

The feature of the fuel cell of the present invention lies in the shape of the oxidizing gas channels. Hereafter, the shape of the oxidizing gas channels will be described in detail with reference to the drawings.

Figure 3:
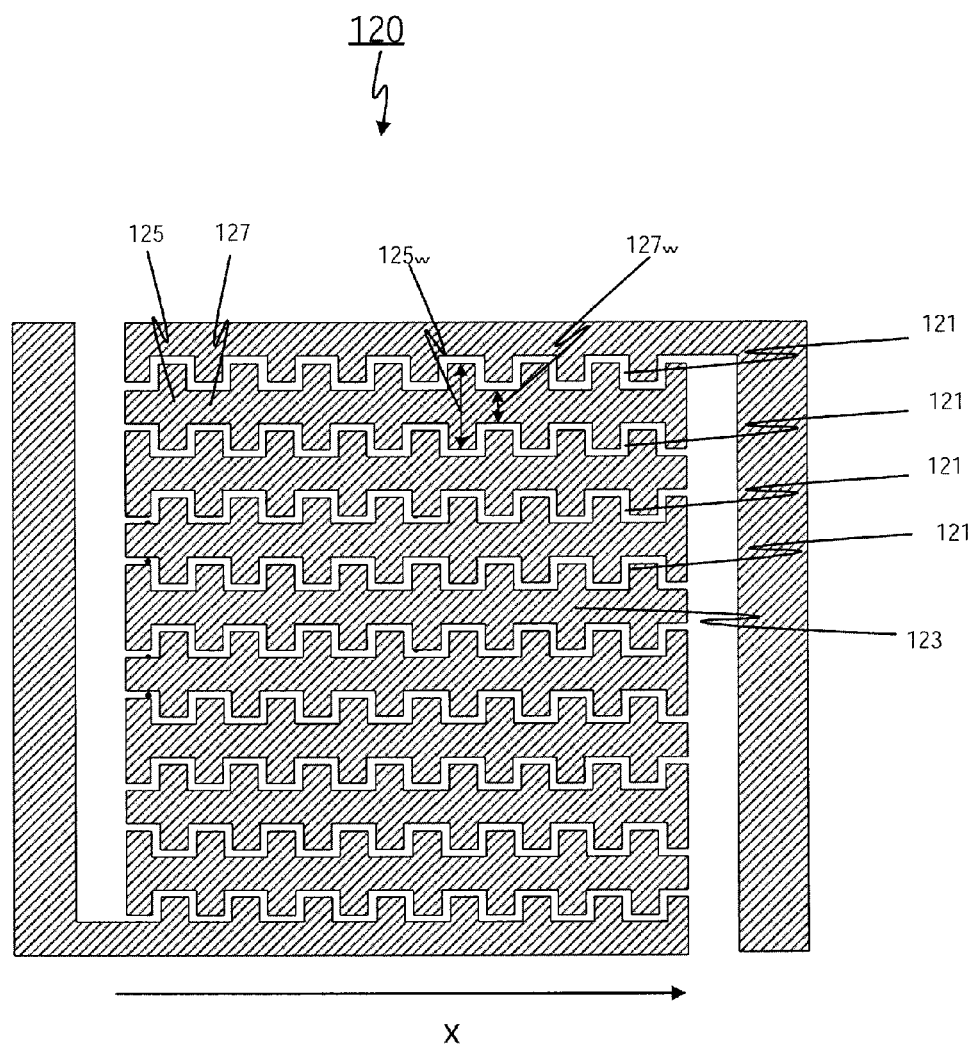
FIG. 3 illustrates a pattern of oxidizing gas channels of a fuel cell of the present invention.

FIG. 3 illustrates one example of a pattern of oxidizing gas channels according to the present invention. FIG. 3 illustrates an example in which oxidizing gas channels 121 are formed in air electrode separator 120. As illustrated in FIG. 3, air electrode separator 120 includes a plurality of oxidizing gas channels 121 and ribs 123 which define oxidizing gas channels 121, both of which are running in specific direction X. As used herein, "specific direction X" indicates the direction in which an oxidizing gas flows. Rib 123 forms a gap between adjacent oxidizing gas channels 121.

As illustrated in FIG. 3, between two adjacent oxidizing gas flow channels, parts 125 which correspond to portions of rib 123 with large gap (rib width) between the oxidizing gas channels (hereinafter referred to as "water retention regions 125) and parts 127 which correspond to portions of rib 123 with small gap (rib width) between the oxidizing gas channels (hereinafter referred to as "oxidizing gas supply regions") are alternately arranged along specific direction X. As used herein, the term "water retention region" means a region where water is held during operation of the fuel cell, and the term "oxidizing gas supply region" means a region to which an oxidizing gas is supplied intensively during the operation of the fuel cell. This will be described in detail later.

Maximum gap 125$w$ between two adjacent oxidizing gas channels (hereinafter may simply be referred to as "water retention region's width") is preferably 2 to 4 times as large as minimum gap 127$w$ between the two adjacent oxidizing gas channels (hereinafter may simply be referred to as "oxidizing gas supply region's width). More specifically, water retention region's width 125$w$ is preferably 3 to 6 mm, and oxidizing gas channel's width 127$w$ is preferably 1.4 to 3.1 mm.

Figure 4C:
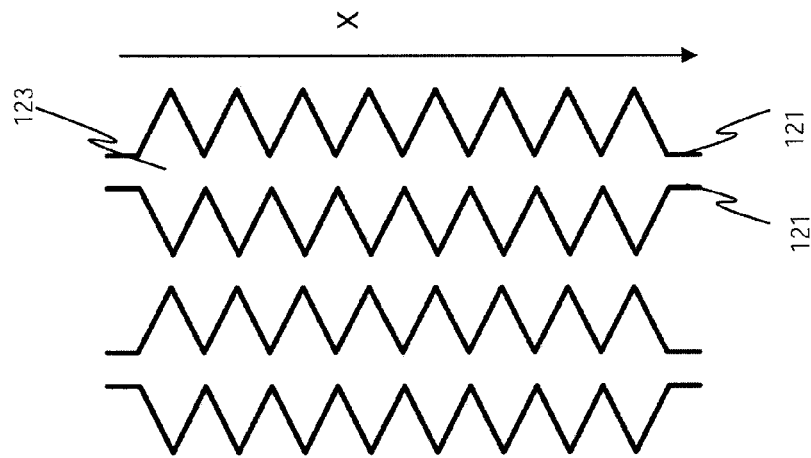
FIGS. 4A to 4C illustrate patterns of oxidizing gas channels of a fuel cell of the present invention.
Figure 4B:
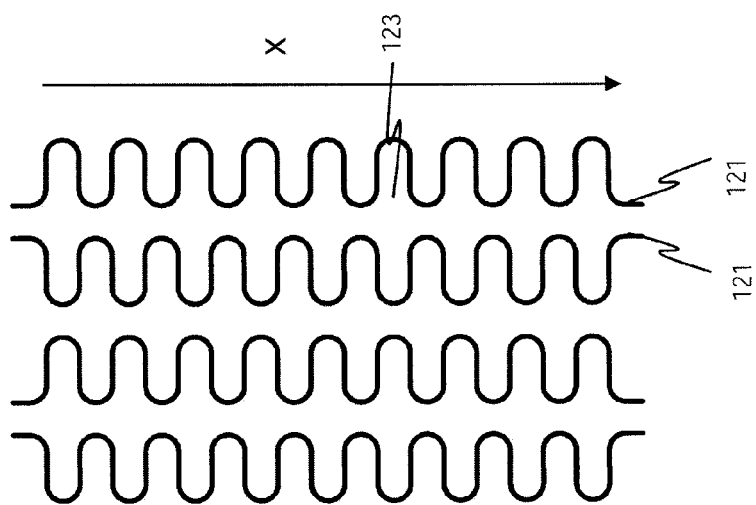
Figure 4A:
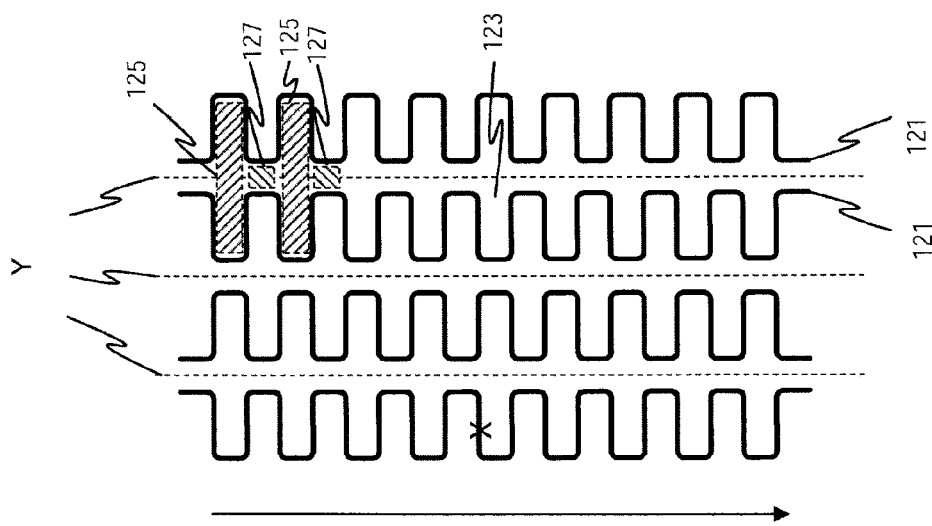

Alternate arrangement of water retention regions and oxidizing gas supply regions along a specific direction may be achieved by making two adjacent oxidizing gas channels serpentine and making them symmetrical with respect to a line running in parallel to the specific direction. Alternatively, one of the two adjacent oxidizing gas channels may be made serpentine while making the other linear. FIGS. 4A to 4C illustrate examples in which two adjacent oxidizing gas channels are made serpentine.

FIGS. 4A to 4C illustrate patterns of oxidizing gas channels of a fuel cell of the present invention. As illustrated in FIGS. 4A to 4C, two adjacent oxidizing gas channels 121 and 121' are both made serpentine. Further, oxidizing gas channels 121 and 121' are symmetrical with respect to line Y that runs in parallel to specific direction X.

By making oxidizing gas channels 121 and 121' serpentine and making them symmetrical with respect to line Y, water retention regions 125 and oxidizing gas supply regions 127 are alternately arranged along specific direction X.

The oxidizing gas channel may serpentine at right angle (see FIG. 4A), may serpentine in a curve pattern (see FIG. 4B), or may serpentine in a zigzag pattern (see FIG. 4C).

(4) Fuel Gas Channel

A fuel gas channel is a channel through which a fuel gas is supplied to the fuel electrode. Preferably, the fuel gas channel is 0.8 to 1.2 mm in width and 0.3 to 0.7 mm in depth. The shape of the fuel gas channel is preferably linear, as opposed to serpentine shape of the oxidizing gas channel. The fuel gas channels preferably run in parallel to specific direction X described above. Protrusion may be provided in the fuel gas channel in order to adjust the pressure drop of fuel gas. Preferably, the ribs defining the fuel gas channels are generally impermeable to a fuel gas. By making the ribs defining the fuel gas channels impermeable to a fuel gas, it is possible to intensively supply the fuel gas to desired regions.

In the present invention, fuel gas channels are formed in the fuel electrode separator. The fuel electrode separator may be a carbon separator or a metal separator.

(5) Positional Relationship of Oxidizing Gas Channels and Fuel Gas Channels.

Another feature of the present invention lies in the positional relationship of oxidizing gas channels and fuel gas channels. Specifically, in a fuel cell of the present invention, a fuel gas channel selectively overlaps water retention regions and oxidizing gas supply regions. Moreover, the fuel gas channel does not overlap an oxidizing gas channel at portions parallel to the fuel gas channel. As used herein, "overlap" means such a relationship where portions overlap when the fuel cell is seen in the direction normal to the MEA surface.

Figure 5:
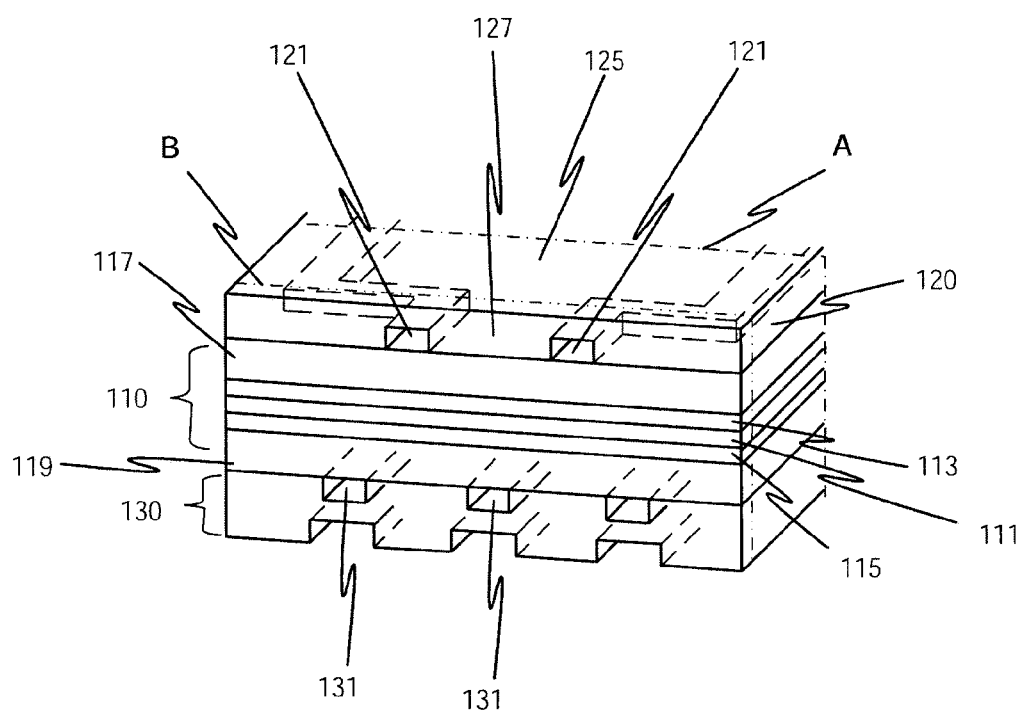
FIG. 5 is a perspective view of a section of a fuel cell of the present invention.

FIG. 5 is a perspective view of a section of a fuel cell of the present invention, illustrating the positional relationship of fuel gas channels and oxidizing gas channels. The fuel cell illustrated in FIG. 5 includes MEA 110, air electrode separator 120, fuel electrode separator 130, oxidizing gas channels 121, and fuel gas channels 131. MEA 110 includes polymer electrolyte membrane 111, air electrode catalyst layer 113, fuel electrode catalyst layer 115, air electrode gas diffusion layer 117, and fuel electrode gas diffusion layer 119.

Figure 6B:
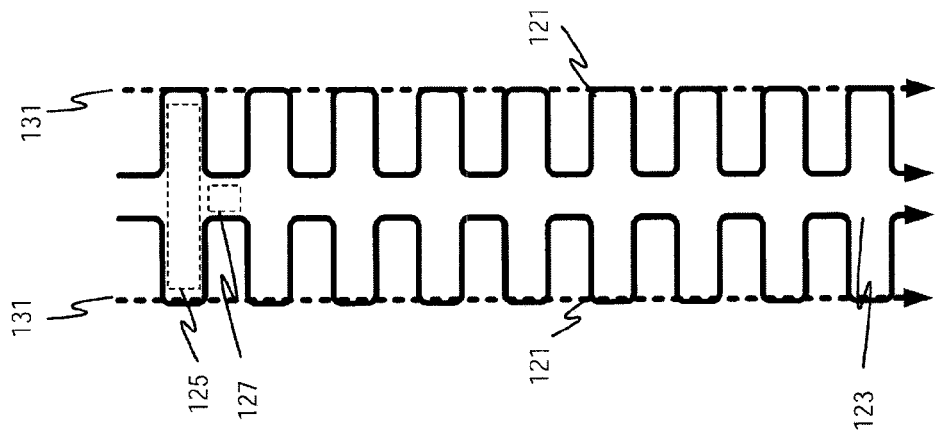
FIGS. 6A and 6B illustrate a positional relationship of oxidizing gas channels and fuel gas channels in a fuel cell of the present invention.
Figure 6A:
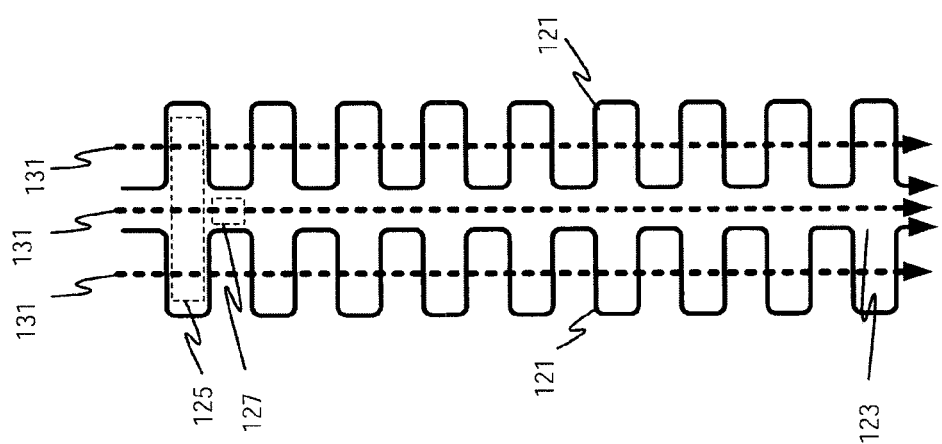

FIG. 6A illustrates a positional relationship of oxidizing gas channels 121 and fuel gas channel 131 of FIG. 5, when seen in the direction normal to the MEA 110 surface.

As represented by fuel gas channel 131' of FIG. 5 and FIG. 6A, fuel gas channels selectively overlap water retention regions 125 and oxidizing gas supply regions 127. As represented by fuel gas channels 131 of FIG. 5 and FIG. 6A, fuel gas channels may be so arranged as to overlap only water retention regions 125. On the other hand, it is not preferable to arrange fuel gas channels 131 so as to overlap oxidizing gas channels 121 at portions parallel to fuel gas channels 131, as illustrated in FIG. 6B. The reason for this is that since the water generated in the air electrode passes through oxidizing gas channels and is discharged to the outside as will be described later, the humidity of MEA drops at regions where oxidizing gas channels are provided, resulting in elevation of membrane resistance in the polymer electrolyte membrane.

By arranging fuel gas channels in such a way as to overlap water retention regions, it is possible to supply a fuel gas to regions with high water content (low MEA membrane resistance), allowing protons to be transported to the air electrode side efficiently. Moreover, by arranging fuel gas channels in such a way as to overlap water retention regions and oxidizing gas supply regions, it is possible to supply a fuel gas to regions with high water content and high oxidizing gas content, allowing electric energy to be generated more efficiently.

The direction in which an oxidizing gas flows through an oxidizing gas channel and the direction in which a fuel gas flows through a fuel gas channel vary depending on the operating conditions of the fuel cell. For example, when the fuel cell is operated under the condition of moderate temperature and non-humidity, it is preferable that the oxidizing gas and fuel gas flow in the same direction. Accordingly, when the fuel cell is operated under the condition of moderate temperature and non-humidity, the flow direction of oxidizing gas and the flow direction of fuel gas are the same as specific direction X.

As used herein, the term "condition of moderate temperature and non-humidity" means an operating condition under which the oxidizing gas to be supplied to a fuel cell is not humidified. Specifically, the condition of moderate temperature and non-humidity means such a condition where the temperature of the fuel cell during power generation is 55 to 75° C.; the dew point of the oxidizing gas to be supplied to the fuel cell is 45° C. or less, preferably −10 to 45° C.; and the dew point of the fuel gas to be supplied to the fuel cell is 50 to 70° C. Dew point increases with increasing water content in the gas, and decreases with deceasing water content in the gas. Under the condition of moderate temperature and non-humidity, the dew point of oxidizing gas is generally smaller than that of fuel gas by 20° C. or more.

On the other hand, when the fuel cell is operated under the condition of high temperature and low humidity, it is preferable that the oxidizing gas and fuel gas flow in opposite directions. Accordingly, when the fuel cell is operated under the condition of high temperature and low humidity, the flow direction of fuel gas is opposite to specific direction X.

As used herein, the term "condition of high temperature and low humidity" means such a condition where the temperature of the fuel cell during power generation is 80 to 100° C.; the dew point of the oxidizing gas to be supplied to the fuel cell is 55 to 75° C.; and the dew point of the fuel gas to be supplied to the fuel cell is 50 to 70° C. Under the condition of high temperature and low humidity, the difference in dew point between the oxidizing gas and fuel gas is generally 10° C. or less.

The fuel gas to be supplied to a fuel cell cogeneration system is generally produced by reforming a hydrocarbon gas using a fuel processor. The fuel gas produced by reforming a hydrocarbon gas using a fuel processor has a dew point of 50 to 70° C. The reason that the dew point of fuel gas used in the condition of moderate temperature and non-humidity and the condition of condition of high temperature and low humidity is set relatively high (50 to 70° C.) above is that a fuel gas produced by reforming a hydrocarbon gas using a fuel processor is assumed to be used.

Fuel cells have been described in which an oxidizing gas flows in the same direction in all the oxidizing gas channels (see FIG. 3). In the present invention, however, the flow direction of oxidizing gas needs not to be the same in all the oxidizing gas channels. For example, a fuel cell of the present invention may include oxidizing gas channels such as those illustrated in FIG. 7.

Figure 7:
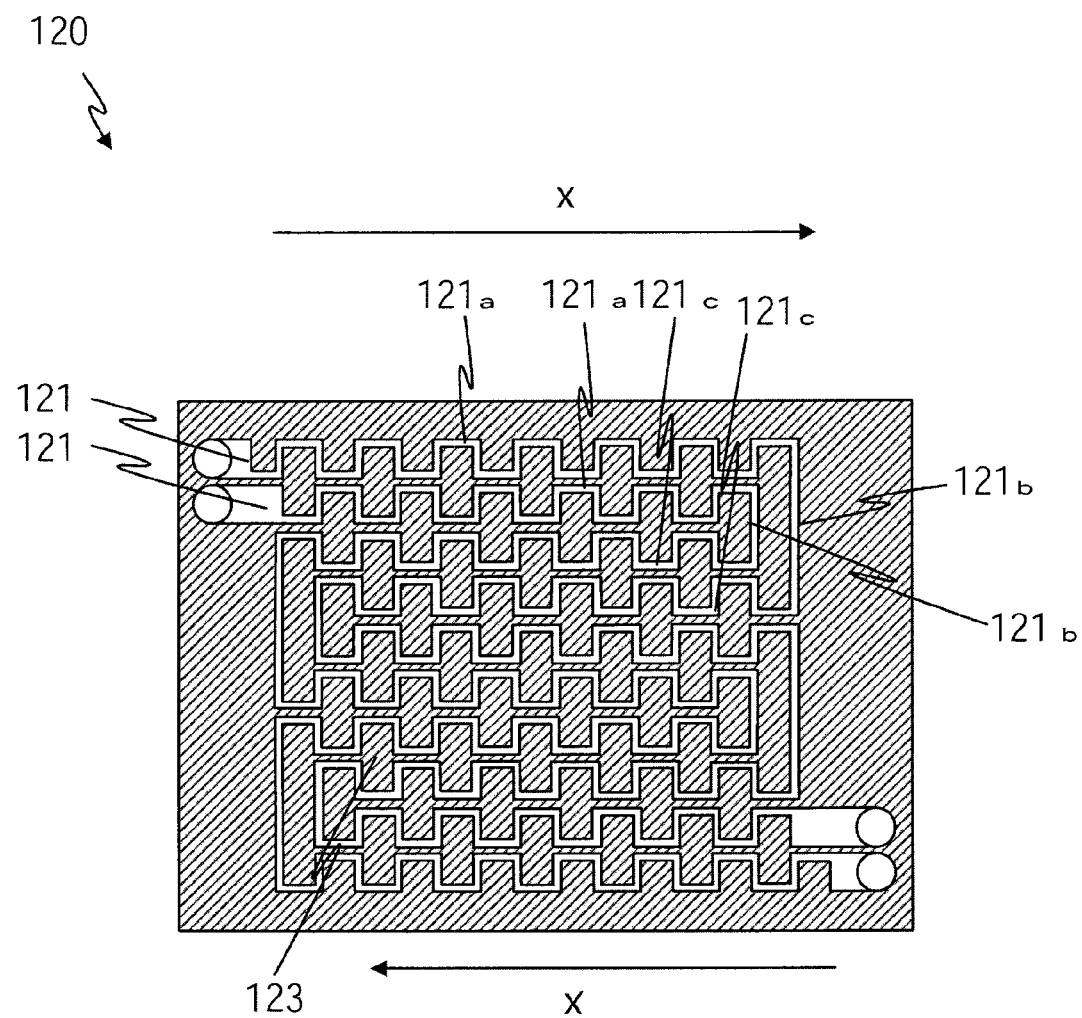
FIG. 7 illustrates a pattern of oxidizing gas channels of a fuel cell of the present invention.

Oxidizing gas channel 121 illustrated in FIG. 7 includes linear region 121a, linear region 121c, and turn region 121b. Turn region 121b connects linear region 121a and linear region 121c. Oxidizing gas channel 121 runs in specific direction X at linear region 121a, a region from the entry of the oxidizing gas channel to the first turn region 121b. That is, in linear region 121a, the oxidizing gas flows in specific direction X. In linear region 121c after turn region 121b, on the other hand, oxidizing gas channel 121 runs in opposite direction X' to specific direction X. That is, in linear region 121c, the oxidizing gas flows in specific direction X'.

In the case where the oxidizing gas channel has a turn region as described above, the fuel gas channel preferably has a turn region correspondingly.

Fuel cells configured as described above may be stacked on top of each other to manufacture a fuel cell stack. A fuel cell stack is typically sandwiched by current collectors, insulating plates, and end plates, and is secured with stud bolts and nuts.

Next will describe how water moves in a fuel cell of the present invention during operation.

During the operation of the fuel cell of the present invention, a non-humidified or less humidified oxidizing gas is supplied to oxidizing gas channels, and a fuel gas which contains hydrogen gas is supplied to fuel gas channels, thereby generating electric energy. Electric energy is generated in the process described below.

First, molecules of hydrogen supplied to the fuel electrode diffuse through the fuel electrode gas diffusion layer to the fuel electrode catalyst layer, where each hydrogen molecule is divided into protons and electrons. The protons then moves through the humidified polymer electrolyte membrane to the air electrode, and the electrons move through an external circuit to the air electrode. The electrons passing through the external circuit may be recovered as electric energy. In the air electrode catalyst layer, the protons from the polymer electrolyte membrane, the electrons from the external circuit, and oxygen supplied to the air electrode react together to produce water.

As described above, in a fuel cell of the present invention, a non-humidified or less humidified oxidizing gas is supplied to oxidizing gas channels. In the conventional fuel cell, supplying a non-humidified or less humidified oxidizing gas to oxidizing gas channels may result in drying up of the polymer electrolyte membrane near the entry of the oxidizing gas channels, leading to elevation of membrane resistance and reducing output density. In the fuel cell of the present invention, by contrast, the generated water can be retained even near the entry of oxidizing gas channels, because water retention regions are provided between adjacent oxidizing gas channels. Moreover, because oxidizing gas supply regions are provided between adjacent oxidizing gas channels, it is possible to supply sufficient quantity of oxidizing gas to the MEA. Hereinafter, the movement of water in a fuel cell of the present invention will be described with reference to the drawings.

Figure 8A:
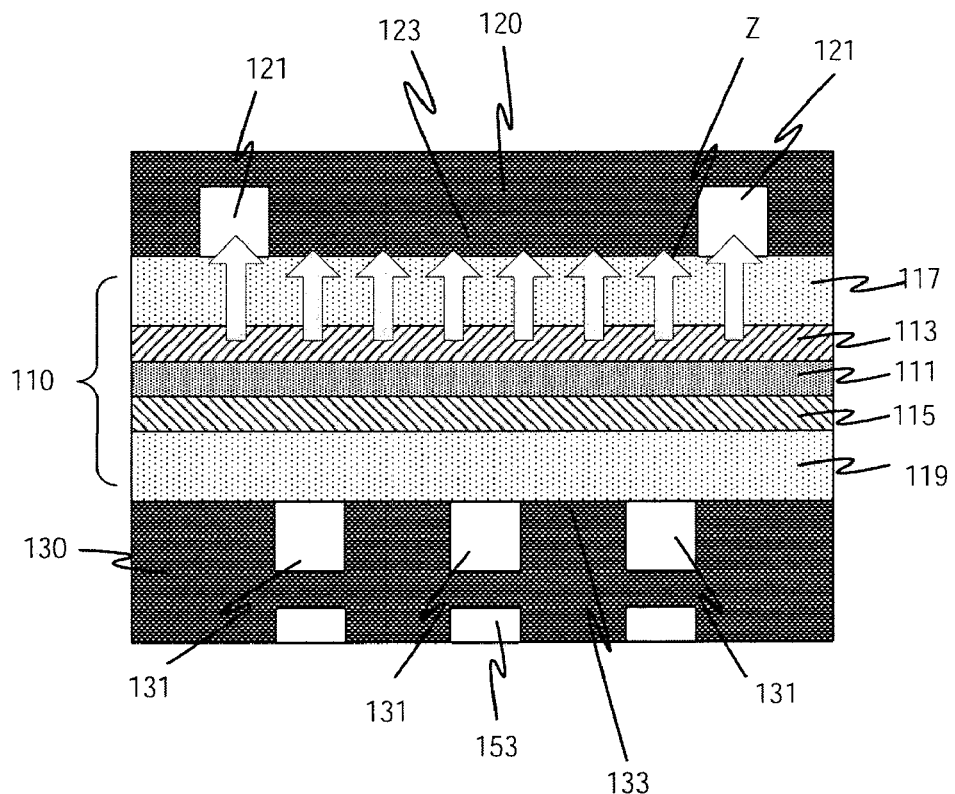
FIGS. 8A and 8B illustrate how water in a fuel cell of the present invention moves.

FIG. 8A is a sectional view, cut along dashed dotted line A, of fuel cell 100 of the present invention illustrated in FIG. 5, illustrating a section of water retention region 125. Arrows Z in FIG. 8A indicate movements of water. As illustrated in FIG. 8A, since the gap between oxidizing gas channels 121 and 121' is large (rib width is large) in the water retention region, most of the water generated in air electrode catalyst layer 113 diffuse under rib 123 and is retained there. Moreover, since the gap between oxidizing gas channels 121 and 121' is large in the water retention region, it is less likely that the water retained under rib 123 diffuses into oxidizing gas channel 121. In this way, water generated as a result of power generation is retained in water retention region 125.

Figure 8B:
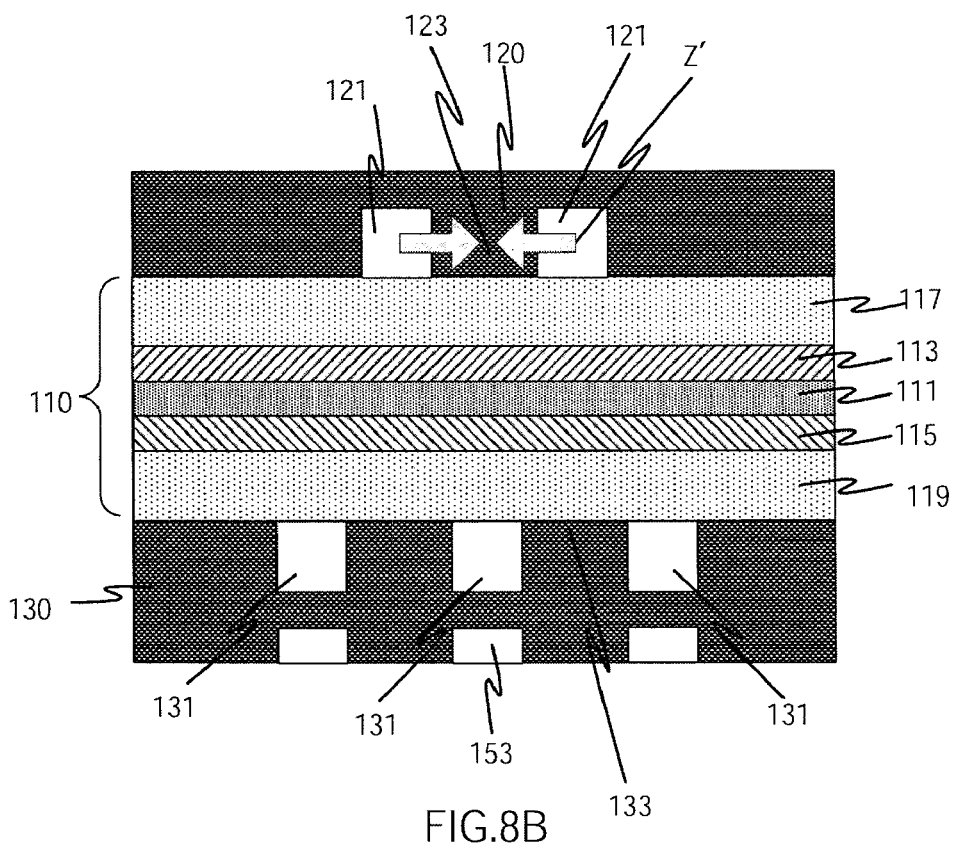

FIG. 8B is a sectional view, cut along two-dot chain line B, of fuel cell 100 of the present invention illustrated in FIG. 5, illustrating a section of oxidizing gas supply region 127. Arrows Z' in FIG. 8B indicate movements of oxidizing gas. As illustrated in FIG. 8B, in the oxidizing gas supply region, the gap between oxidizing gas channels 121 and 121' is small (rib width is small). Further, as described above, rib 123 is made of porous body which is permeable to an oxidizing gas. Accordingly, the oxidizing gas flows into the oxidizing gas supply region from both oxidizing gas channel 121 and oxidizing gas channel 121'. Thus the oxidizing gas is intensively supplied to the oxidizing gas supply region.

On the other hand, since the gap between oxidizing gas channels 121 and 121' is small (rib width is small) in the oxidizing gas supply region, it is likely that the water held under rib 123 flows into the oxidizing gas channels. Thus, water is not retained under the rib.

In this way, in a fuel cell of the present invention, it is possible to alternately form regions with high water content and regions with high oxygen concentration along specific direction, by alternately arranging water retention regions and oxidizing gas supply regions along the specific direction. This makes it possible to supply a sufficient quantity of oxygen to the air electrode while retaining water in the fuel cell.

Further, by arranging fuel gas channels so as to selectively overlap water retention regions and oxidizing gas supply regions, it is possible to supply a fuel gas to regions of the polymer electrolyte membrane where membrane resistance is low and oxidizing gas concentration is high. It is thus possible to generate electric energy more efficiently.

Therefore, according to the present invention, even when a non-humidified or less humidified oxygen gas is employed, it is possible to ensure MEA's durability and high power density.

Hereafter, embodiments of the present invention will be described in detail with reference to the drawings.

Embodiment 1

Embodiment 1 describes a fuel cell in which oxidizing gas channels are formed in the air electrode separator and the fuel electrode separator is a metal separator.

Figure 9:
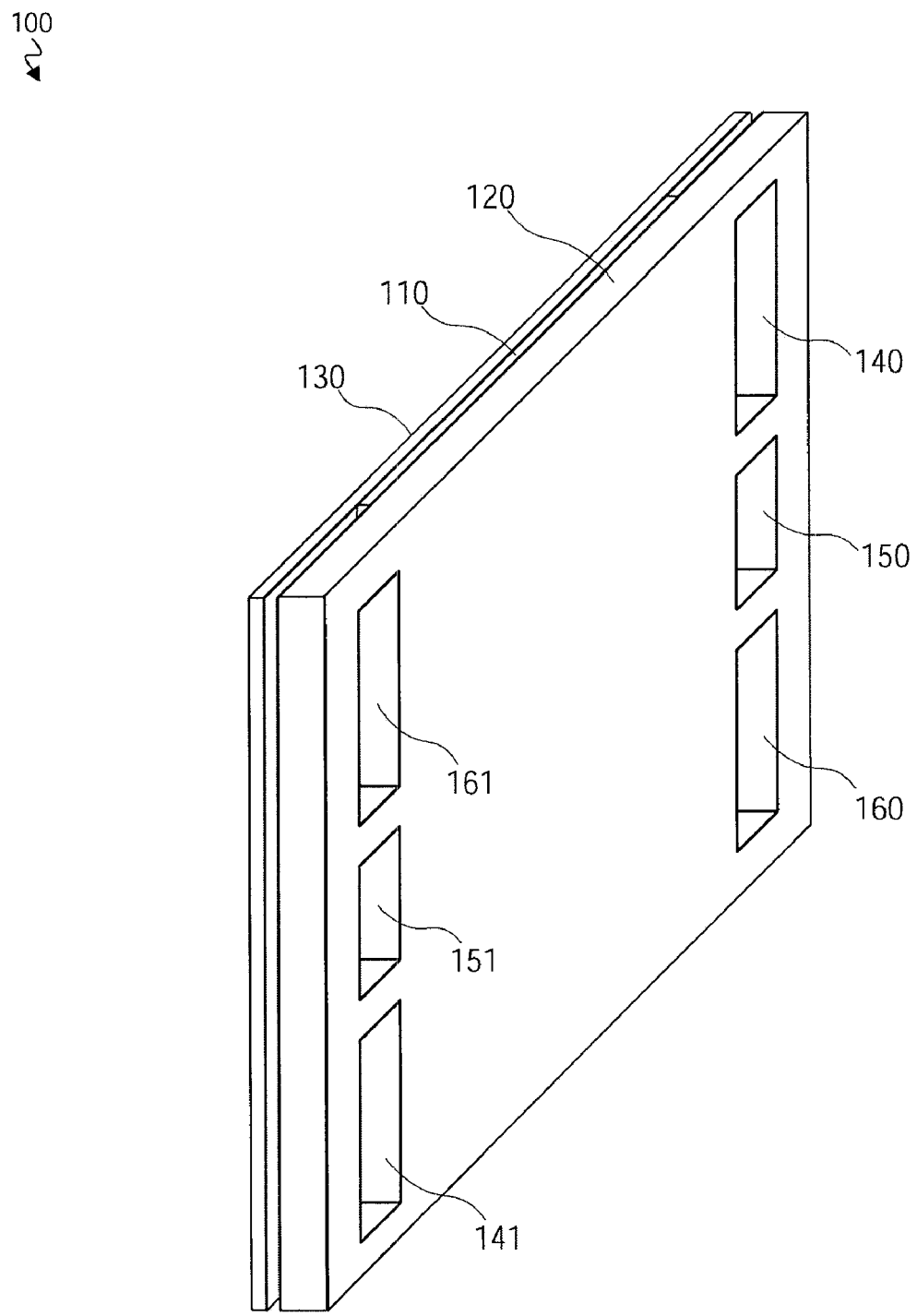
FIG. 9 is a perspective view of a fuel cell of Embodiment 1.
Figure 10:
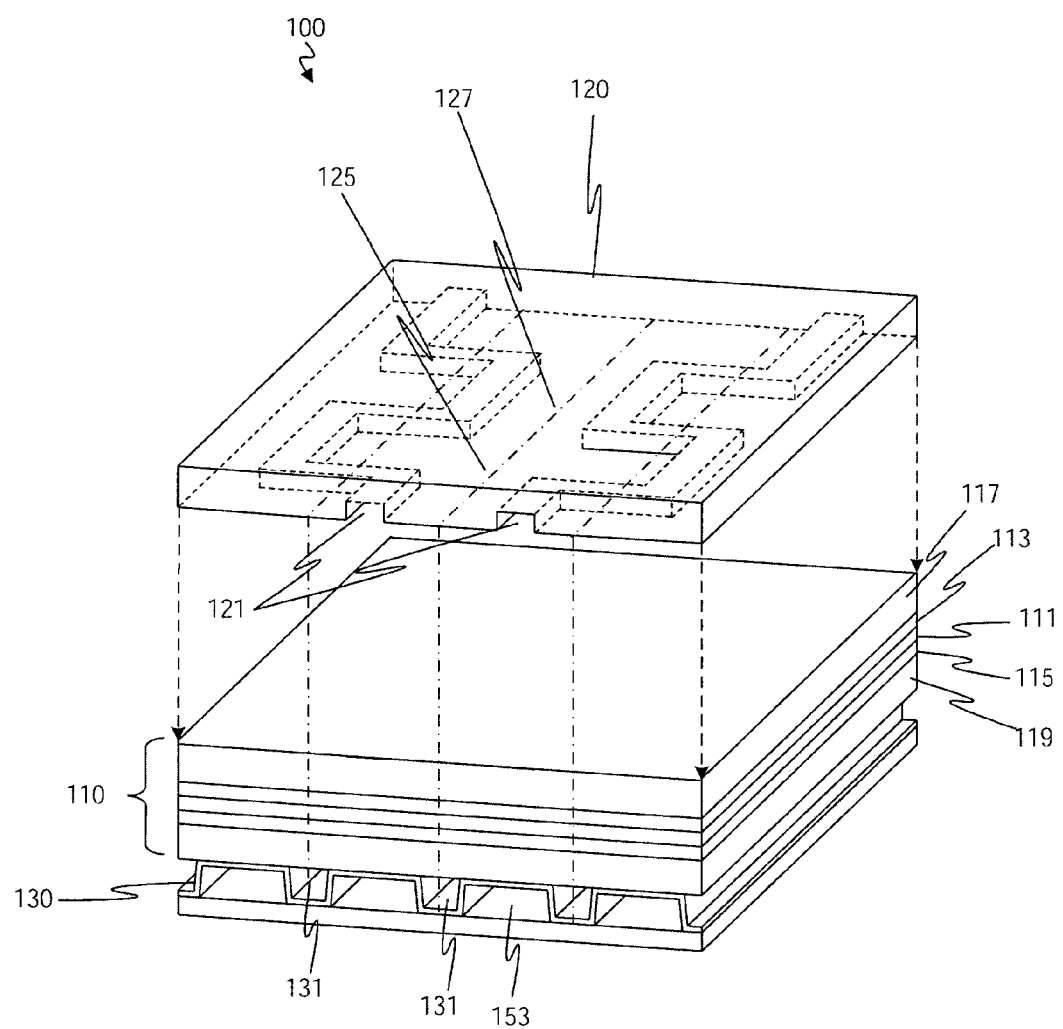
FIG. 10 is an exploded perspective view of the fuel cell of Embodiment 1.

FIG. 9 is a perspective view of a fuel cell of Embodiment 1. FIG. 10 is a part of the exploded perspective view of fuel cell 100 of Embodiment 1.

As illustrated in FIGS. 9 and 10, fuel cell 100 includes MEA 110, air electrode separator 120, and fuel electrode separator 130. MEA 110 includes polymer electrolyte membrane 111, air electrode catalyst layer 113, fuel electrode catalyst layer 115, air electrode gas diffusion layer 117, and fuel electrode gas diffusion layer 119.

As illustrated in FIG. 10, oxidizing gas channel 121 is formed in air electrode separator 120. Fuel electrode separator 130 is a metal separator whose section has waveform shape. Fuel electrode separator 130 includes fuel gas channel 131 on the surface which contacts MEA 110, and coolant channel 153 on the opposite surface to MEA 110. Fuel gas channel 131' selectively overlaps water retention regions 125 and oxidizing gas supply regions 127, but does not overlap portions of oxidizing gas channel 121 which are parallel to fuel gas channel 131.

Figure 11:
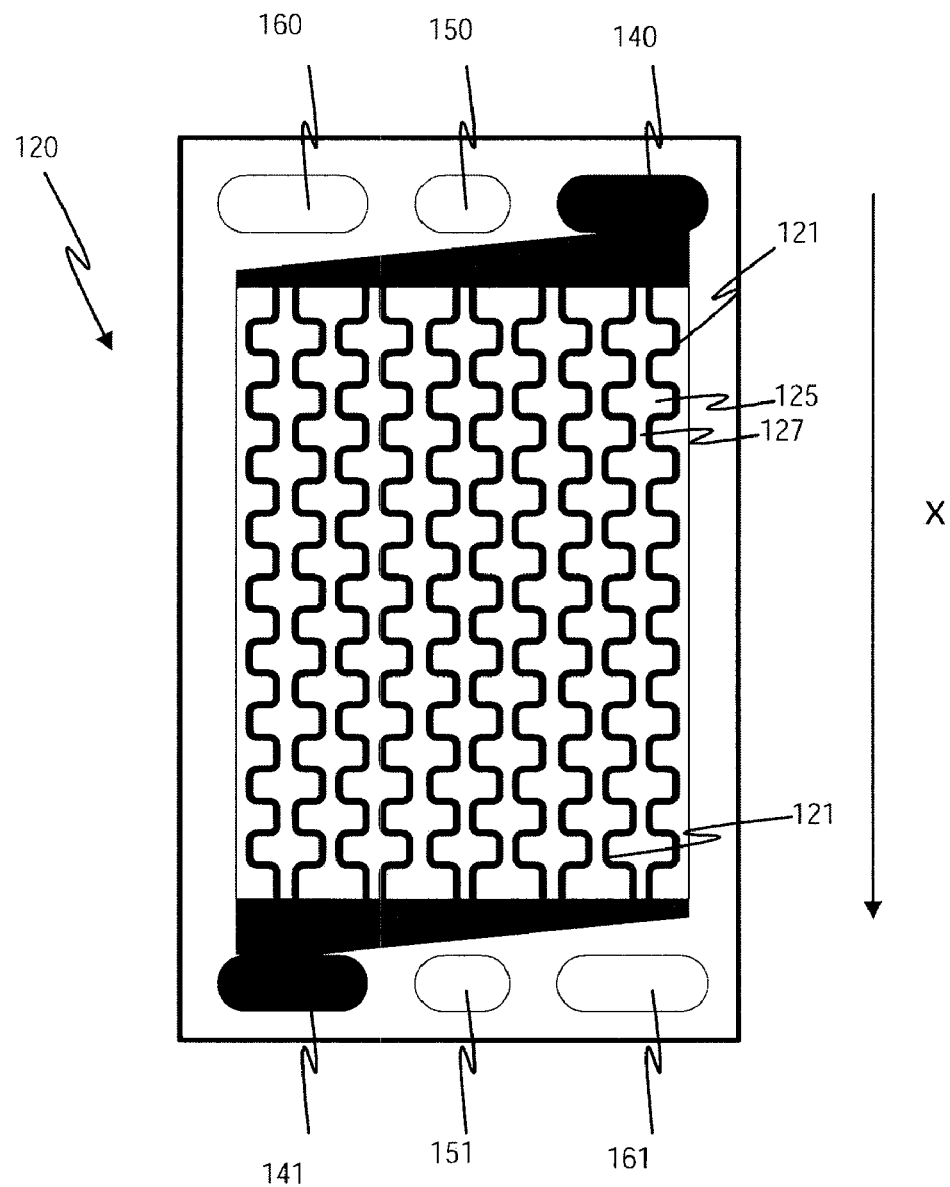
FIG. 11 is a top view of an air electrode separator of the fuel cell of Embodiment 1.

FIG. 11 is a top view of air electrode separator 120 illustrated in FIGS. 9 and 10.

As illustrated in FIG. 11, air electrode separator 120 in Embodiment 1 includes a set of oxidizing gas supply manifold hole 140 and oxidizing gas discharge manifold hole 141, a set of fuel gas supply manifold hole 160 and fuel gas discharge manifold hole 161, and a set of coolant supply manifold hole 150 and coolant discharge manifold hole 151.

Oxidizing gas supply manifold hole 140 is a hole for supplying an oxidizing gas to oxidizing gas channel 121. Oxidizing gas discharge manifold hole 141 is a hole for discharging an oxidizing gas from oxidizing gas channel 121.

In this embodiment, oxidizing gas channel 121 is formed in air electrode separator 120, as described above. Thus air electrode separator 120 includes two or more oxidizing gas channels 121 running in specific direction X. Two or more oxidizing gas channels 121 are made serpentine and are symmetrical with respect to a line parallel to specific direction X. Thus, air electrode separator 120 includes alternating water retention regions 125 and oxidizing gas supply regions 127 along specific direction X.

Figure 12:
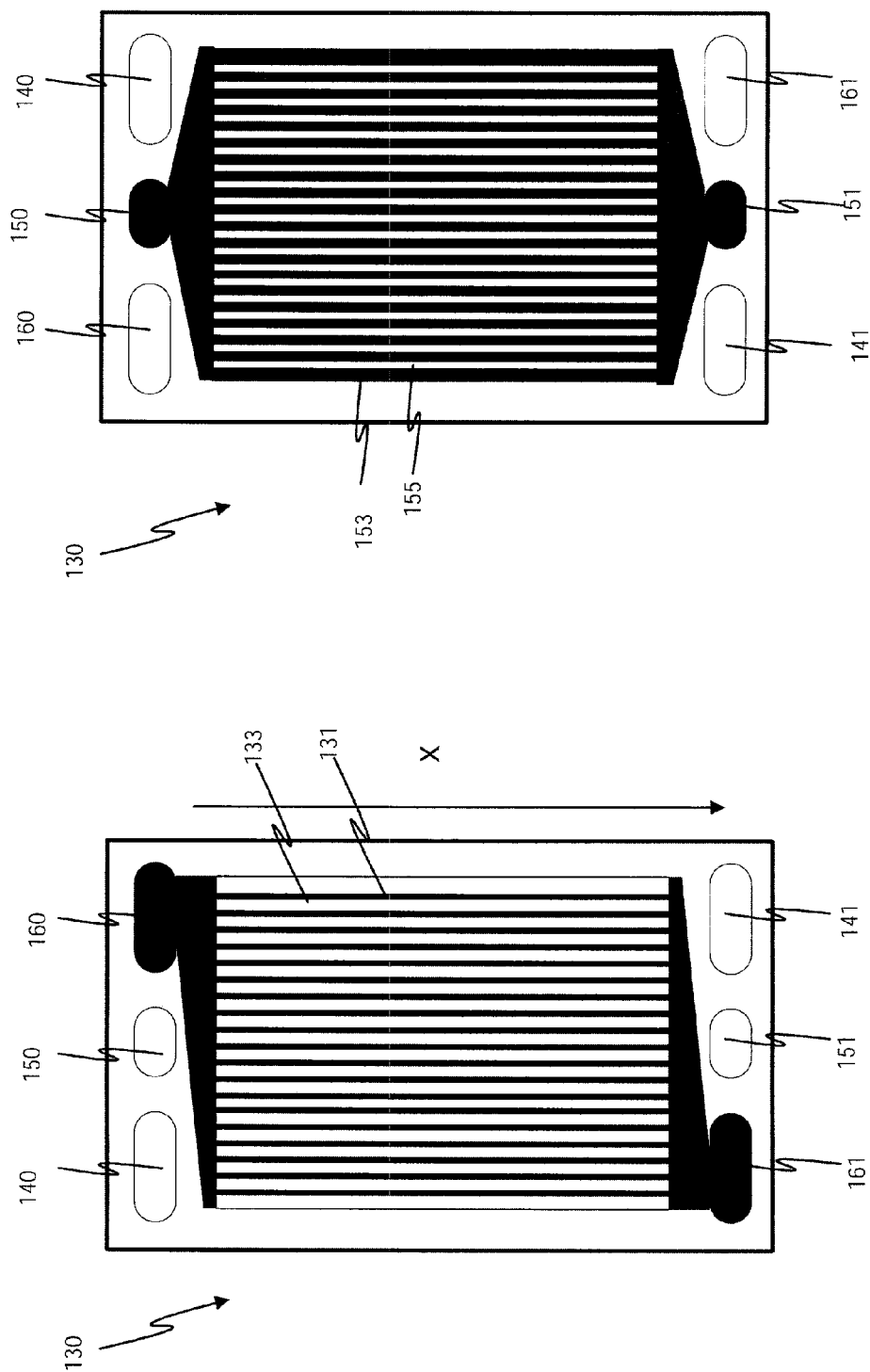
FIGS. 12A and 12B are top views of a fuel electrode separator of the fuel cell of Embodiment 1.

FIGS. 12A and 12B are top views of fuel electrode separator 130 illustrated in FIGS. 9 and 10. FIG. 12A is a top view of the surface of fuel electrode separator 130 on which fuel gas channels 131 are formed, and FIG. 12B is a top view of back surface 130' of fuel electrode separator 130 illustrated in FIG. 11A. Two or more coolant channels 153 running in parallel to one another are formed on back surface 130'.

As illustrated in FIGS. 12A and 12B, fuel electrode separator 130 in Embodiment 1 includes a set of oxidizing gas supply manifold hole 140 and oxidizing gas discharge manifold hole 141, a set of fuel gas supply manifold hole 160 and fuel gas discharge manifold hole 161, and a set of coolant supply manifold hole 150 and coolant discharge manifold hole 151. Two or more fuel gas channels 131 running in parallel to one another are formed in fuel electrode separator 130.

Fuel gas supply manifold hole 160 is a hole for supplying a fuel gas to fuel gas channel 131. Fuel gas discharge manifold hole 161 is a hole for discharging a fuel gas from fuel gas channel 131.

Coolant supply manifold hole 150 is a hole for supplying a coolant to coolant channel 153. Coolant discharge manifold hole 151 is a hole for discharging a coolant from coolant channel 153.

Because fuel electrode separator 130 is a metal separator as mentioned above, fuel gas channel 131 and coolant channel 153 are like two sides of the same coin. That is, rib 133 formed on fuel electrode separator 130 corresponds to coolant channel 153 in back surface 130', and rib 155 formed on back surface 130' corresponds to fuel gas channel 131 in fuel electrode separator 130 (see FIG. 10).

By alternately arranging water retention regions and oxidizing gas supply regions along specific direction between adjacent oxidizing gas channels of the fuel cell of Embodiment 1 in this way, it is possible to retain a sufficient quantity of water in the fuel cell as well as to supply a sufficient quantity of oxidizing gas, even when a less humidified or non-humidified oxygen gas is employed.

By arranging fuel gas channels so as to selectively overlap water retention regions and oxidizing gas supply regions, it is possible to supply a fuel gas to regions of the polymer electrolyte membrane where membrane resistance is low and oxidizing gas concentration is high. It is thus possible to generate electric energy more efficiently. According to this embodiment, it is thus possible to ensure MEA's durability and high power density even when a non-humidified or less humidified oxygen gas is employed.

Embodiment 2

Embodiment 1 described a fuel cell in which both of upstream oxidizing gas channels and downstream oxidizing gas channels are made serpentine. Embodiment 2 describes a fuel cell in which upstream oxidizing gas channels are made serpentine whereas downstream oxidizing gas channels are made linear.

The fuel cell of Embodiment 2 is identical to fuel cell 100 of Embodiment 1 except for the shape of downstream oxidizing gas channels. Accordingly, this embodiment only provides description of the shape of oxidizing gas channels.

Figure 13:
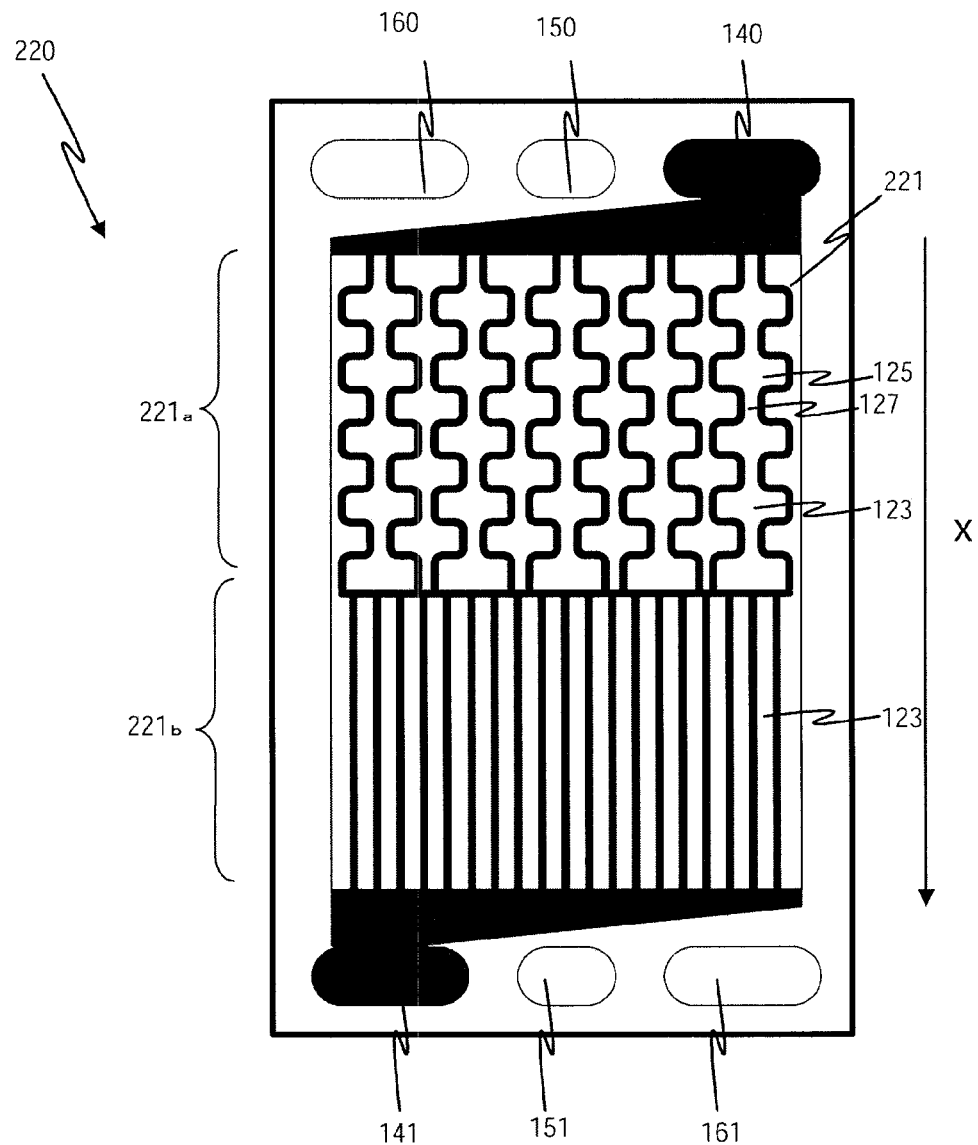
FIG. 13 is a top view of an air electrode separator of a fuel cell of Embodiment 2.

FIG. 13 is a top view of air electrode separator 220 of the fuel cell of Embodiment 2. The same components as those for air electrode separator 120 of Embodiment 1 are given the same numerals and the descriptions thereof are omitted.

Air electrode separator 220 illustrated in the FIG. 13 includes two or more oxidizing gas channels 221 running in specific direction X. Oxidizing gas channels 221 consists of upstream region 221a and downstream region 221b. As used herein, the term "upstream region" means a region of oxidizing gas channels at the oxidizing gas supply manifold hole 140 side, and the term "downstream region" means a region of oxidizing gas channels at the oxidizing gas discharge manifold hole side.

In upstream region 221a, oxidizing gas channels 221 are made serpentine. In upstream region 221a, adjacent oxidizing gas channels 221 are symmetrical with respect to a line running in parallel to specific direction X. Thus, in upstream region 221a, water retention regions 125 and oxidizing gas supply regions 127 are alternately arranged along specific direction between adjacent oxidizing gas channels.

On the other hand, in downstream region 221b, oxidizing gas channels 221 are linear. Accordingly, the gaps between adjacent oxidizing gas channels 221 (width of rib 123) are the same in downstream region 221b. The gap between adjacent oxidizing gas channels 221 in downstream region 221b is smaller than the maximum gap between adjacent oxidizing gas channels 221 (width of water retention region 125) in upstream region 221a. The gap between adjacent oxidizing gas channels 221 in downstream region 221b is preferably comparable to the width of oxidizing gas supply region 127 arranged between adjacent oxidizing gas channels 221 in upstream region 221a. Thus, since the gap between adjacent oxidizing gas channels 221 in downstream region 221b is smaller than the gap between adjacent oxidizing gas channels 221 in upstream region 221a, the number of oxidizing gas channels 221 is larger in downstream region 221b than in upstream region 221a.

By forming water retention regions only in the upstream region in this way, water can be retained exclusively near the oxidizing gas supply manifold hole (upstream region) of the fuel cell, a region where water is particularly liable to dry up. In the downstream region where an oxidizing gas is liable to be depleted, by reducing the gap between adjacent oxidizing gas channels by making the oxidizing gas channels linear, more oxidizing gas can be supplied.

Embodiment 3

Embodiments 1 and 2 described a fuel cell in which oxidizing gas channels are formed in the air electrode separator. Embodiment 3 describes a fuel cell in which oxidizing gas channels are formed in the air electrode gas diffusion layer.

FIG. 14 is an exploded perspective view of fuel cell 300 of Embodiment 3. The same components as those of fuel cell 100 of Embodiment 1 are given the same references, and descriptions thereof are omitted.

As illustrated in FIG. 14, fuel cell 300 includes air electrode gas diffusion layer 317 and air electrode separator 320. Oxidizing gas channels 121 are formed in air electrode gas diffusion layer 317. Air electrode separator 320 is a flat plate.

EXPERIMENTAL EXAMPLE 1

In Experimental Example 1, generated voltage level, membrane resistance and reaction gas's relative humidity of the fuel cells of Embodiments 1 and 2 operated under the condition of moderate temperature and non-humidity were analyzed by computer simulation.

Figure 15:
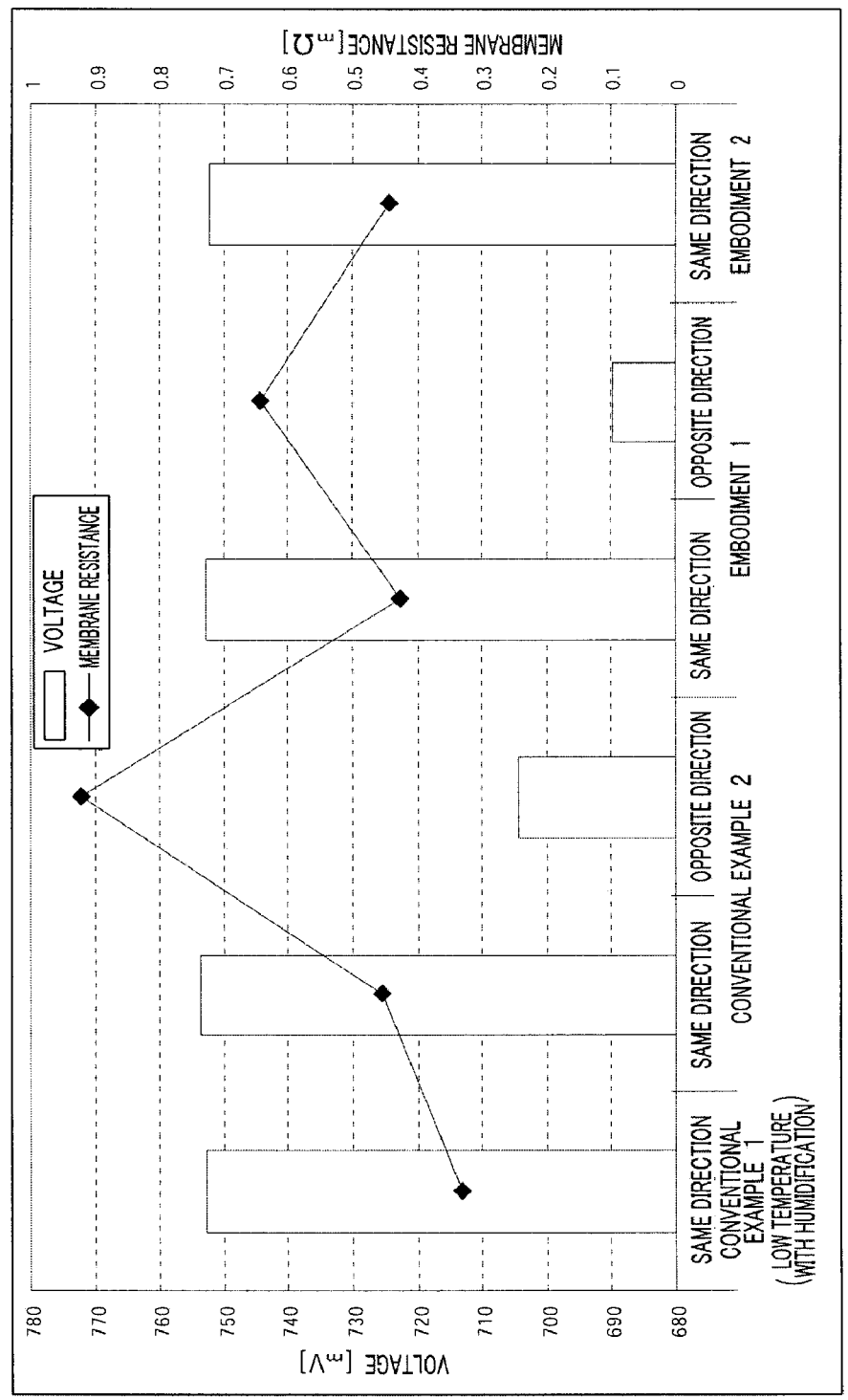
FIG. 15 is a graph of generated voltage level and membrane resistance of a fuel cell of the present invention operated under the condition of moderate temperature and non-humidity.

FIG. 15 shows a simulation result of generated voltage level and membrane resistance of the fuel cells of Embodiments 1 and 2 operated under the condition of moderate temperature and non-humidity (fuel cell temperature during power generation: 65° C., dew point of oxidizing gas: 35° C., dew point of fuel gas: 65° C.).

As comparative examples, a simulation result of generated voltage level and membrane resistance of a conventional fuel cell—a fuel cell without any water retention region and oxidizing gas supply region—operated under the condition of moderate temperature and full-humidity (fuel cell temperature during power generation: 65° C., dew point of oxidizing gas: 65° C., dew point of fuel gas: 65° C.) (Conventional Example 1), and a simulation result of generated voltage level and membrane resistance of a conventional fuel cell operated under the condition of moderate temperature and non-humidity (Conventional Example 2) are also given.

In FIG. 15, the term "same direction" means that an oxidizing gas and a fuel gas flow in the same direction, and the term "opposite direction" means that an oxidizing gas and a fuel gas flow in opposite directions.

As shown in FIG. 15, in the case of the fuel cells of Conventional Example 2 and Embodiment 1 operated under the condition of moderate temperature and non-humidity, the generated power is high when oxidizing gas and fuel gas flow in the same direction as compared to when they flow in opposite directions. This result suggests that under the condition of moderate temperature and non-humidity, power generation performance is high when oxidizing gas and fuel gas flow in the same direction.

It was also revealed that the fuel cells of Conventional Example 2 and Embodiments 1 and 2 generated voltage comparable to that of the conventional fuel cell operated under the condition of moderate temperature and full-humidity (Conventional Example 1). The fuel cells of Embodiments 1 and 2, however, exhibited low membrane resistance compared to the fuel cell of Conventional Example 2. This result suggests that the fuel cells of Embodiments 1 and 2 have high water content in MEA compared to the fuel cell of Conventional Example 2.

Figure 16A:
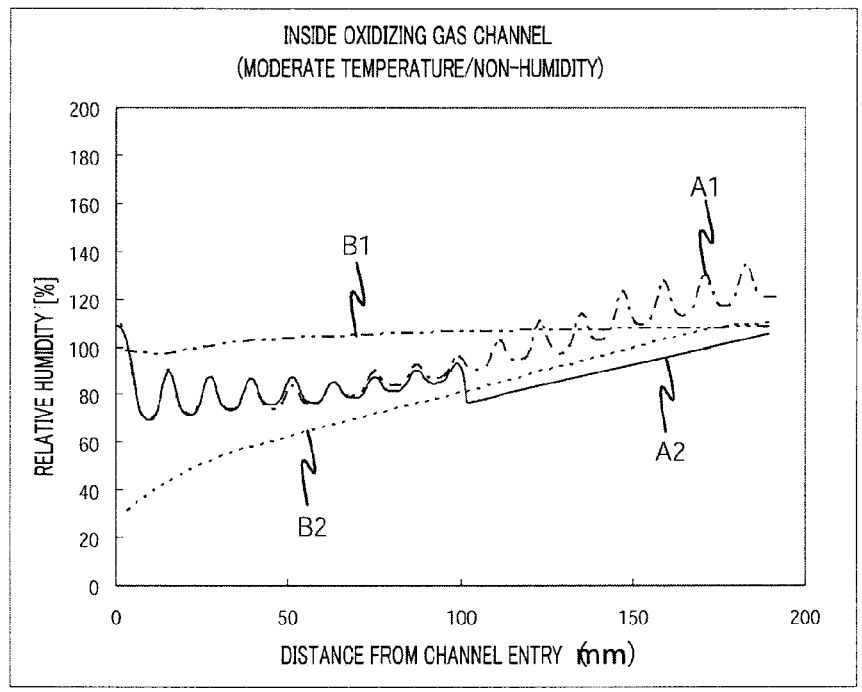
FIGS. 16A and 16B are graphs of relative humidity in gas channels in a fuel cell of the present invention operated under the condition of moderate temperature and non-humidity.
Figure 16B:
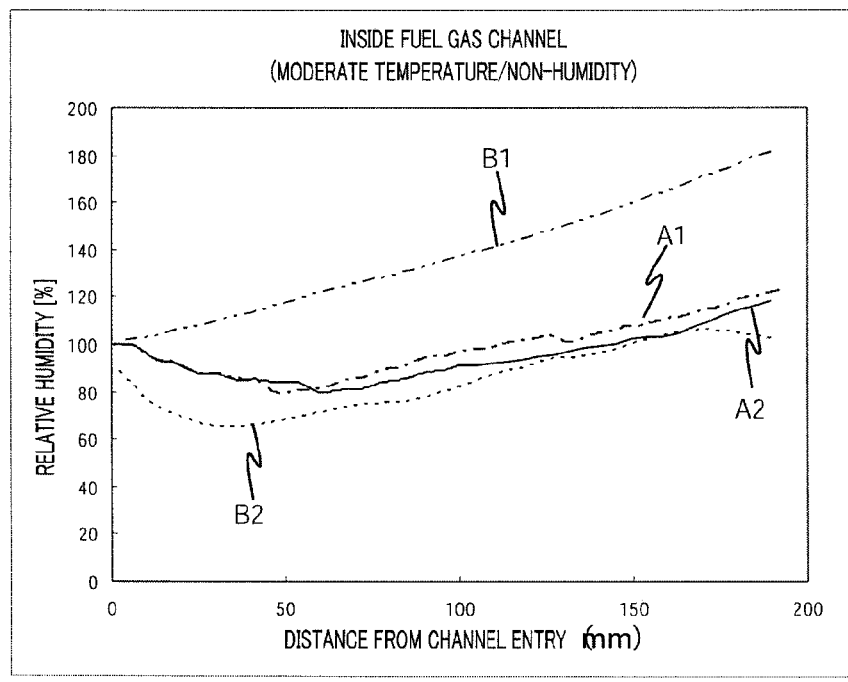

FIGS. 16A and 16B show a simulation result of relative humidity in the oxidizing gas channel (FIG. 16A) and relative humidity in the fuel gas channel (FIG. 16B) of the fuel cells of Embodiments 1 and 2 operated under the condition of moderate temperature and non-humidity.

As comparative examples, a simulation result of relative humidity in the gas channel of the conventional fuel cell operated under the condition of moderate temperature and full-humidity (Conventional Example 1), and a simulation result of relative humidity in the gas channel of the conventional fuel cell operated under the condition of moderate temperature and non-humidity (Conventional Example 2) are also given.

In these simulations, the flow direction of oxidizing gas and the flow direction of fuel gas are the same.

In FIGS. 16A and 16B, dashed dotted line A1 indicates relative humidity in Embodiment 1; solid line A2 relative humidity in Embodiment 2; two-dot chain line B1 relative humidity in Conventional Example 1; and dotted line B2 relative humidity in Conventional Example 2.

As shown in FIG. 16A, the relative humidity in the oxidizing gas channel of the fuel cells of Embodiments 1 and 2 was generally retained at 70% or higher even near the entry of the channel, a region which is most liable to dry up. By contrast, the fuel cell of Conventional Example 2 exhibited a relative humidity of not greater than 30% near the entry of the oxidizing gas channel.

Further, while the fuel cell of Embodiment 1 exhibited a relative humidity of exceeding 100% near the exit of the oxidizing gas channel, the fuel cell of Embodiment 2 did not exhibit a relative humidity of exceeding 100% even near the exit of the oxidizing gas channel. This suggests that flooding is less likely to occur near the exit of the oxidizing gas channel in the fuel cell of Embodiment 2.

As shown in FIG. 16B, the relative humidity in the fuel gas channels of the fuel cells of Embodiments 1 and 2 was generally retained at 80% or higher. On the other hand, the relative humidity in the fuel gas channel of the fuel cell of Conventional Example 2 was not greater than 70% near the entry of the fuel gas channel.

Thus, under the condition of moderate temperature and non-humidity, the fuel cells according to embodiments of the present invention exhibited high relative humidity and low membrane resistance compared to the conventional fuel cells. It is thus expected that the fuel cell of the present invention exhibits high MEA durability compared to conventional fuel cells under the condition of moderate temperature and non-humidity.

EXPERIMENTAL EXAMPLE 2

In Experimental Example 2, generated voltage level, membrane resistance and reaction gas's relative humidity of the fuel cells of Embodiments 1 and 2 operated under the condition of high temperature and low humidity were analyzed by computer simulation.

Figure 17:
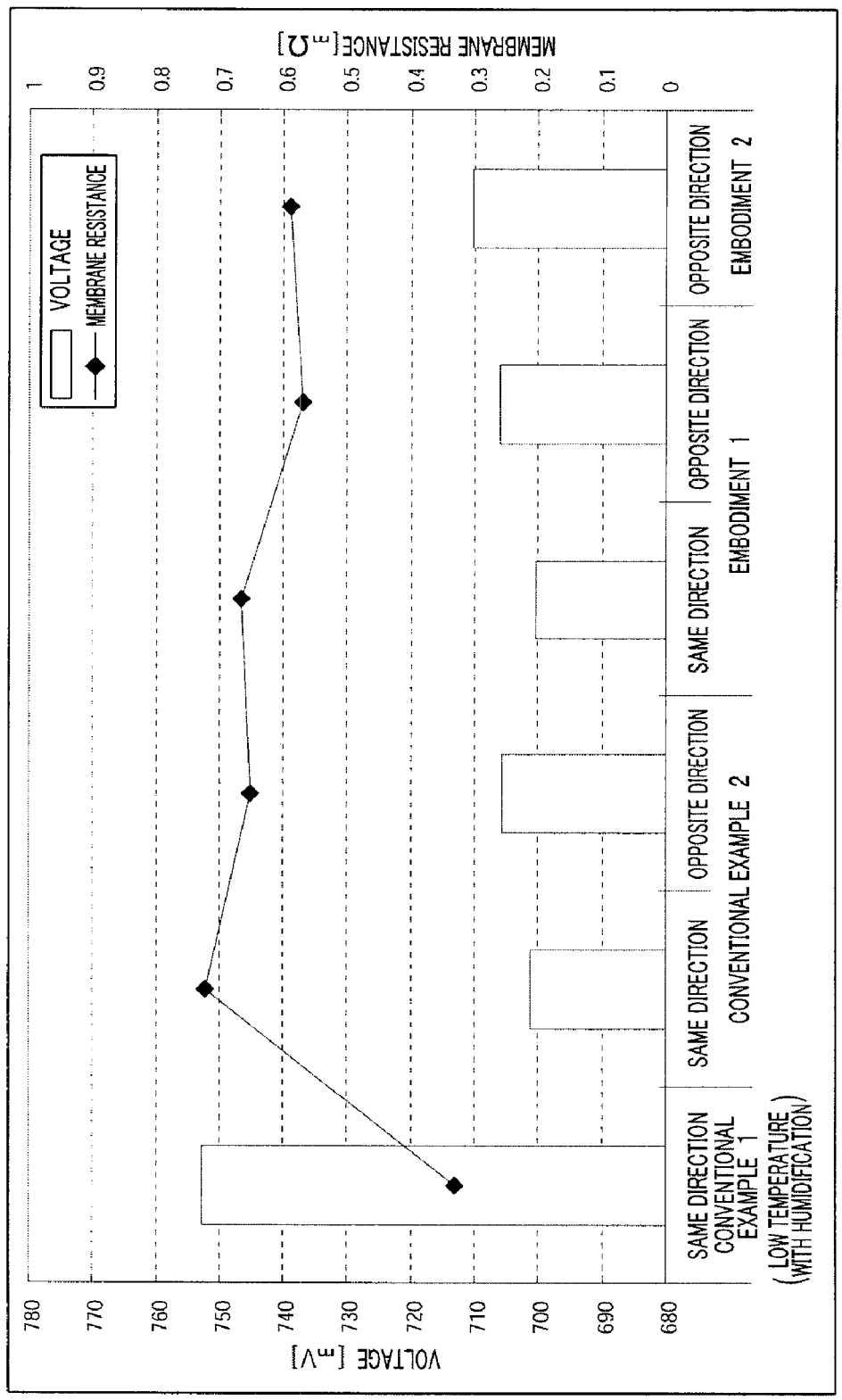
FIG. 17 is a graph of generated voltage level and membrane resistance of a fuel cell of the present invention operated under the condition of high temperature and low humidity.

FIG. 17 shows a simulation result of generated voltage level and membrane resistance of the fuel cells of Embodiments 1 and 2 operated under the condition of high temperature and low humidity (fuel cell temperature during power generation: 90° C., dew point of oxidizing gas: 65° C., dew point of fuel gas: 65° C.).

As comparative examples, a simulation result of generated voltage level and membrane resistance of the conventional fuel cell operated under the condition of moderate temperature and full-humidity (Conventional Example 1), and a simulation result of generated voltage level and membrane resistance of the conventional fuel cell operated under the condition of high temperature and low humidity (Conventional Example 2) are also given.

In FIG. 17, the term "same direction" means that an oxidizing gas and a fuel gas flow in the same direction, and the term "opposite direction" means that an oxidizing gas and a fuel gas flow in opposite directions.

As shown in FIG. 17, in the case of the fuel cells of Conventional Example 2 and Embodiment 1, the generated power is high when oxidizing gas and fuel gas flow in opposite directions as compared to when they flow in the same direction. This result suggests that under the condition of high temperature and low humidity, power generation performance is high when oxidizing gas and fuel gas flow in opposite directions.

The fuel cells of Embodiments 1 and 2 exhibited low membrane resistance compared to the fuel cell of Conventional Example 2. This result suggests that the fuel cells of Embodiments 1 and 2 have high water content compared to the fuel cell of Conventional Example 2. Further, the fuel cell of Embodiment 2 generated high voltage compared to the fuel cells of Conventional Example 2 and Embodiment 1.

Figure 18A:
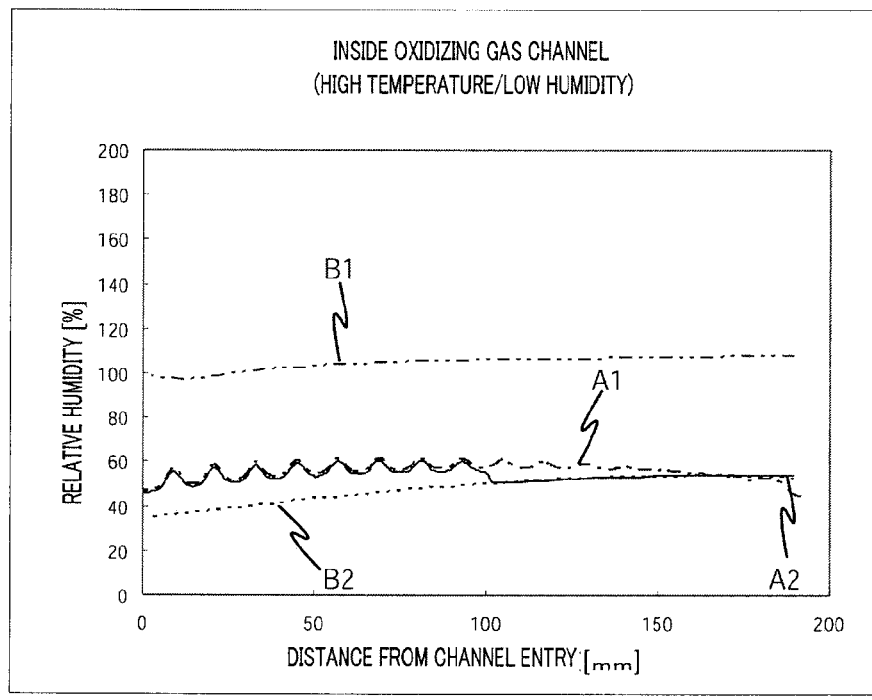
FIGS. 18A and 18B are graphs of relative humidity in gas channels in a fuel cell of the present invention operated under the condition of high temperature and low humidity.
Figure 18B:
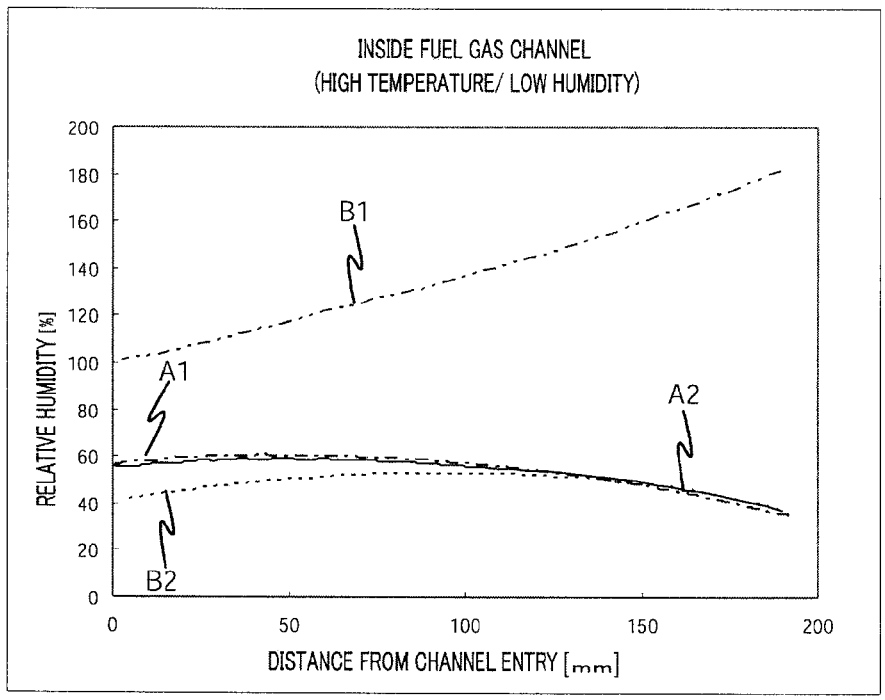

FIGS. 18A and 18B show a simulation result of relative humidity in the oxidizing gas channel (FIG. 18A) and relative humidity in the fuel gas channel (FIG. 18B) of the fuel cells of Embodiments 1 and 2 operated under the condition of high temperature and low humidity.

As comparative examples, a simulation result of relative humidity in the gas channel of the conventional fuel cell operated under the condition of moderate temperature and full-humidity (Conventional Example 1), and a simulation result of relative humidity in the gas channel of the conventional fuel cell operated under the condition of high temperature and low humidity (Conventional Example 2) are also given.

In these simulations, the flow direction of oxidizing gas and the flow direction of fuel gas are opposite.

In FIGS. 18A and 18B, dashed dotted line A1 indicates relative humidity in Embodiment 1; solid line A2 relative humidity in Embodiment 2; two-dot chain line B1 relative humidity in Conventional Example 1; and dotted line B2 relative humidity in Conventional Example 2.

As shown in FIG. 18A, the relative humidity in the oxidizing gas channel of the fuel cells of Embodiments 1 and 2 was generally retained at 40% or higher even near the entry of the channel, a region which is most liable to dry up. By contrast, the fuel cell of Conventional Example 2 exhibited a relative humidity of not greater than 40% near the entry of the oxidizing gas channel.

As shown in FIG. 18B, while the relative humidity in the fuel gas channel of the fuel cells of Embodiments 1 and 2 was generally retained at 60% near the entry of the channel, the corresponding relative humidity in Conventional Example 2 did not exceed 60%.

Thus, under the condition of high temperature and low humidity, the fuel cells according to embodiments of the present invention generated high voltage and exhibited low membrane resistance, compared to the conventional fuel cells. It is thus expected that the fuel cell of the present invention exhibits high MEA durability as well as high output density compared to conventional fuel cells under the condition of high temperature and low humidity.

EXPERIMENTAL EXAMPLE 3

This experimental example describes a simulation experiment demonstrating that the output level of the fuel cell changes with changing widths of water retention regions and oxidizing gas supply regions.

FLUENT12 (from ANSYS) was used as a simulation program.

Parameters in the simulation are described below.

Catalyst electrode' size was set to 200 mm in length. The width of the oxidizing gas channel was set to 1.0 mm, and the depth was set to 0.3 mm. The width of the fuel gas channel was set to 1.0 mm, and the depth was set to 0.5 mm. The thickness of the polymer electrolyte membrane was set to 30 µm; the thickness of the air electrode catalyst layer was set to 10 µm; the thickness of the air electrode gas diffusion layer was set to 200 µm; the thickness of the fuel electrode catalyst layer was set to 10 µm; and the thickness of the fuel electrode gas diffusion layer was set to 400 µm. The gas diffusion ability of the gas diffusion layers was made comparable to that of paper type or cloth type one.

The dew point of oxidizing gas was set to 65° C., the dew point of fuel gas was set to 65° C., and cell temperature was set to 80° C. The availability of oxidizing gas (air) was set to 55%, and the availability of fuel gas (75% of hydrogen and 25% of carbon dioxide) was set to 75%.

The width of oxidizing gas supply regions was varied within the range of 0 to 6 mm. The width of water retention regions was varied within the range of 2 to 8 mm—oxidizing gas supply region's width plus 2 mm, a value corresponds to the total width of two channels.

Figure 19:
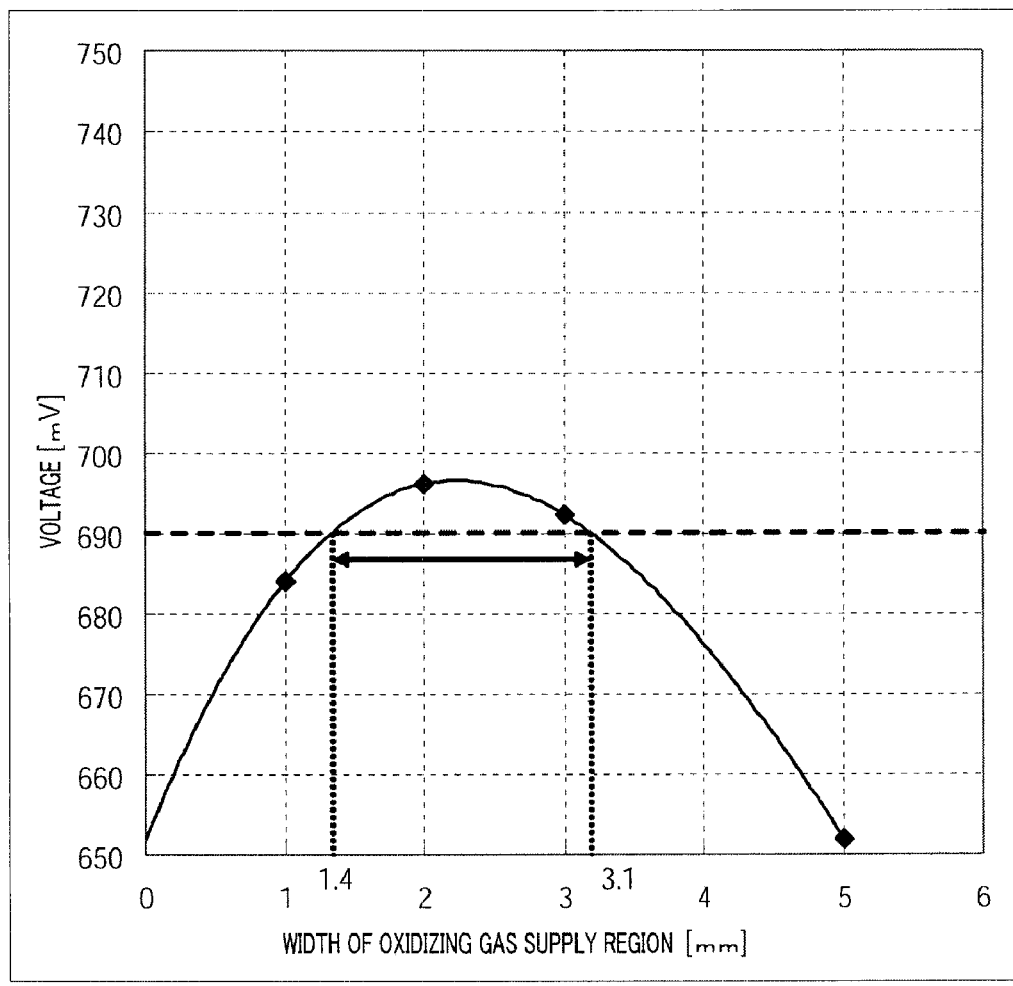
FIG. 19 is a graph showing the result of experimental example 3.

FIG. 19 is a graph of the analysis result of Experimental Example 3, where the horizontal axis is oxidizing gas supply region's width, and the longitudinal axis is generated voltage level. As shown in FIG. 19, the generated voltage level increases when the oxidizing gas supply region's width is from 0 to 2 mm, and decreases when the width is over 2 mm. Moreover, the generated voltage level becomes particularly high (over 6.9 mV) when the oxidizing gas supply region's width is from 1.4 to 3.1 mm.

This result suggests that generated voltage level increases when the oxidizing gas supply region's width is from 1.4 to 3.1 mm and the water retention region's width is from 3.4 to 5.1 mm.

The present application claims the priority of Japanese Patent Application No. 2008-290010 filed on Nov. 12, 2008, the entire contents of which are herein incorporated by reference.

INDUSTRIAL APPLICABILITY

A fuel cell of the present invention is useful as a polymer electrolyte fuel cell or the like operated under the condition of high temperature and low humidity or the condition of moderate temperature and non-humidity.

REFERENCE SINGS LIST 100, 300: Fuel cell
110: MEA
111: Polymer electrolyte membrane
113: Air electrode catalyst layer
115: Fuel electrode catalyst layer
117, 317: Air electrode gas diffusion layer
119: Fuel electrode gas diffusion layer
120, 220, 320: Air electrode separator
121, 221: Oxidizing gas channel
123, 133, 155: Rib
125: Water retention region
127: Oxidizing gas supply region
130: Fuel electrode separator
131: Fuel gas channel
140: Oxidizing gas supply manifold hole
141: Oxidizing gas discharge manifold hole
150: Coolant supply manifold hole
151: Coolant discharge manifold hole
153: Coolant channel
160: Fuel gas supply manifold hole
161: Fuel gas discharge manifold hole

The invention claimed is:

1. A fuel cell comprising:
    a membrane electrolyte assembly including a polymer electrolyte membrane and a pair of catalyst electrodes consisting of an air electrode and a fuel electrode, the catalyst electrodes sandwiching the polymer electrolyte membrane;
    a pair of separators consisting of an air electrode separator in which two or more oxidizing gas channels are formed and a fuel electrode separator in which two or more fuel gas channels are formed, the separators sandwiching the membrane electrolyte assembly;
    the two or more oxidizing gas channels can supply an oxidizing gas to the air electrode, and
    the two or more fuel gas channels can supply a fuel gas to the fuel electrode,
    wherein large gaps and small gaps are provided alternately between the two adjacent oxidizing gas channels along a specific direction, and
    the two adjacent oxidizing gas channels are made serpentine and are symmetrical with respect to a line parallel to the specific direction, and
    the fuel gas channels do not overlap portions of the oxidizing gas channels, that are parallel to the fuel gas channels.

2. The fuel cell according to claim 1, wherein the oxidizing gas channels are defined by a rib permeable to the oxidizing gas, and the rib is made of a conductive porous body.

3. The fuel cell according to claim 2, wherein the conductive porous body has an average pore diameter of 10 µm or less.

4. The fuel cell according to claim 1, wherein the air electrode separator includes a metal plate and a rib made of a conductive porous body, the rib formed on the metal plate.

5. The fuel cell according to claim 1, wherein the fuel electrode separator includes a rib defining the fuel gas channels, and
    the rib is impermeable to the fuel gas.

6. The fuel cell according to claim 5, wherein the fuel electrode separator is a carbon separator or a metal separator.

7. The fuel cell according to claim 1, wherein a flow direction of the oxidizing gas in the oxidizing gas channels and a flow direction of the fuel gas in the fuel gas channels are the same as the specific direction, and
    the oxidizing gas to be supplied to the fuel cell has a dew point of 45° C. or less.

8. The fuel cell according to claim 1, wherein a flow direction of the oxidizing gas in the oxidizing gas channels and a flow direction of the fuel gas in the fuel gas channels are the same as the specific direction,
    the oxidizing gas to be supplied to the fuel cell has a dew point of −10 to 45° C., and
    the oxidizing gas to be supplied to the fuel cell is not humidified.

9. The fuel cell according to claim 1, wherein a flow direction of the oxidizing gas in the oxidizing gas channels is the same as the specific direction,
    a flow direction of the fuel gas in the fuel gas channels is opposite to the specific direction, and
    the oxidizing gas to be supplied to the fuel cell has a dew point of 55 to 75° C.

10. The fuel cell according to claim 1, wherein the oxidizing gas channels are composed of a upstream region and a downstream region,
- in the upstream region there are provided large gaps and small gaps alternately between the two adjacent oxidizing gas channels along the specific direction,
- in the downstream region, the gaps between the two adjacent oxidizing gas channels are the same, and
- the gap between the two adjacent oxidizing gas channels in the downstream region is smaller than a maximum gap between the two adjacent oxidizing gas channels in the upstream region.

* * * * *